(12) United States Patent
Tsuzuki et al.

(10) Patent No.: US 10,317,709 B2
(45) Date of Patent: Jun. 11, 2019

(54) OPTICAL MODULATOR

(71) Applicant: NIPPON TELEGRAPH AND TELEPHONE CORPORATION, Tokyo (JP)

(72) Inventors: Ken Tsuzuki, Atsugi (JP); Takashi Saida, Atsugi (JP); Koutaro Takeda, Atsugi (JP); Kentaro Honda, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 15/744,208

(22) PCT Filed: Aug. 3, 2016

(86) PCT No.: PCT/JP2016/003589
§ 371 (c)(1),
(2) Date: Jan. 12, 2018

(87) PCT Pub. No.: WO2017/022246
PCT Pub. Date: Feb. 9, 2017

(65) Prior Publication Data
US 2018/0239176 A1    Aug. 23, 2018

(30) Foreign Application Priority Data

Aug. 4, 2015  (JP) ................................ 2015-154371
May 13, 2016  (JP) ................................ 2016-097403

(51) Int. Cl.
*G02F 1/025* (2006.01)
*G02F 1/225* (2006.01)
*G02F 1/21* (2006.01)

(52) U.S. Cl.
CPC ............. *G02F 1/025* (2013.01); *G02F 1/225* (2013.01); *G02F 1/2255* (2013.01); *G02F 2001/212* (2013.01); *G02F 2203/50* (2013.01)

(58) Field of Classification Search
CPC ...................... G02F 2201/212; G02F 2203/50
(Continued)

(56) References Cited

U.S. PATENT DOCUMENTS

2004/0047529 A1   3/2004   Soda
2013/0100090 A1*  4/2013   Felnhofer ............... H01G 5/16
                                                  345/204
(Continued)

FOREIGN PATENT DOCUMENTS

JP    2004-246219 A    9/2004
WO    2013/062096 A1   5/2013
WO    2014/156684 A1   10/2014

OTHER PUBLICATIONS

Kazuhiro Goi et al., *20Gbps Binary Phase Shift Keying Using Silicon Mach-Zehnder Push-Pull Modulator*, The Institute of Electronics Information and Communication Engineers Electronics Society Convention 2012, C-3-50, 2012, pp. 1 (partial English translation).

(Continued)

*Primary Examiner* — Jerry M Blevins
(74) *Attorney, Agent, or Firm* — Workman Nydegger

(57) ABSTRACT

An optical modulator that suppresses the chirp due to the mask offset, for example during the phase modulation, and that provides a high waveform quality includes: two RF electrodes for applying one pair of differential signal voltages; at least one fixed potential electrodes for applying a fixed potential; a first conductive semiconductor layer and a second conductive semiconductor layer abutted to the RF electrode or a fixed potential electrode; and a light modulation unit including two optical waveguides branched from one optical waveguide that are arranged along a pn junction unit functioning as a boundary between the first and second conductive semiconductor layers, wherein: the semiconductor layers and the electrode are provided so that the integration amounts of the phase changes caused by the offsets (Continued)

of the positions of the pn junction units in the two optical waveguides from a design value is equal between the two optical waveguides.

8 Claims, 36 Drawing Sheets

(58) Field of Classification Search
USPC .......................................................... 385/3
See application file for complete search history.

(56) References Cited

U.S. PATENT DOCUMENTS

| 2014/0112611 A1* | 4/2014 | Vermeulen ............ G02F 1/2257 385/3 |
| 2014/0233878 A1 | 8/2014 | Goi et al. |
| 2015/0043866 A1 | 2/2015 | Chen et al. |
| 2016/0033848 A1* | 2/2016 | Kataoka ................ G02F 1/0316 385/3 |

OTHER PUBLICATIONS

Po Dong et al., *High-Speed Low-Voltage Single-Drive Push-Pull Silicon Mach-Zehnder Modulators*, Optical Express, vol. 20, No. 6, Mar. 12, 2012, pp. 6163-6169.
Diedrik Vermeulen et al., *Demonstration of Silicon Photonics Push-Pull Modulators designed for Manufacturability*, IEEE Photonics Technology Letters, vol. 38, No. 10, May 15, 2016, pp. 1127-1129.
David J. Thompson et al., *High Performance Mach-Zehnder-Based Silicon Optical Modulators*, IEEE Journal of Selected Topics in Quantum Electronics, vol. 19, No. 5, Nov./Dec. 2013, pp. 10.
International Search Report dated Oct. 25, 2016, issued in PCT Application No. PCT/JP2016/003589, filed Aug. 3, 2016.
International Preliminary Report on Patentability dated Feb. 15, 2018, issued in PCT Application No. PCT/JP2016/003589, filed Aug. 3, 2016.
Extended Search Report dated Feb. 12, 2019 in corresponding European Patent Application No. 16832526.4.

* cited by examiner

64QAM MODULATION SIGNAL

OPTICAL MODULATOR

TECHNICAL FIELD

The present invention relates to an optical modulator used in an optical communication system or an optical information processing system. In particular, the invention relates to a structure to suppress the chirp caused in the phase modulation of an optical modulator and to provide an optical modulator that can output modulated light having a high waveform quality.

BACKGROUND ART

A MZ (Mach-Zehnder)-type optical modulator is configured to branch the light having entered from the input-side optical waveguide into two branched lights in two optical waveguides (arms) with 1:1 intensity. The branched lights are allowed to propagate over a fixed length, and subsequently multiplexed again, thereby outputting the resultant light. Phase modulation units provided in the two branched optical waveguides can be used to change the phases of the two lights to thereby change the light interference conditions when the lights are multiplexed. Thus, the output light can have a modulated intensity or phase.

The optical waveguide of the phase modulation unit is made of material such as dielectric substance (e.g., $LiNbO_3$) or semiconductor (e.g., InP, GaAs, Si). A modulation electric signal is inputted to an electrode provided in the vicinity of these optical waveguides to apply a voltage to the optical waveguides, thereby causing a change of the phases of lights propagating along the optical waveguides.

A principle to cause a change of the light phase is mainly provided by the Pockels effect in the case of $LiNbO_3$ or the Pockels effect or the Quantum Confined Stark Effect (QCSE) in the case of InP or GaAs. Si mainly provides the carrier plasma effect.

In order to provide optical communication requiring low power consumption at a high speed, such an optical modulator is required that has a high modulation rate and that has a low driving voltage. In order to provide light modulation at a high speed of 10 Gbps or more and with an amplitude voltage of a few volts, a travelling wave electrode is required. A high-speed modulation electric signal travelling along a travelling wave electrode is matched in speed with the light propagating in the optical waveguide, thus an electric signal is allowed to interact with light while propagating. An optical modulator with a travelling wave electrode of a few millimeters to a few dozens of millimeters length has been put into a practical use (see for example NPL 1).

In the case of this travelling wave electrode type optical modulator, an electrode structure and an optical waveguide structure having a low loss and a small reflection are required that allow an electric signal or light propagating in the waveguide to propagate without causing a deteriorated light intensity.

Furthermore, one of the MZ-type optical modulator has an Si optical modulator in which an optical waveguide is made of Si. The Si optical modulator is configured on an SOI (Silicon on Insulator) substrate. SOI substrate is obtained by allowing an Si thin film to adhere on an oxide film (BOX) layer obtained by thermally-oxidizing the surface of an Si substrate. The Si optical modulator is manufactured by machining the Si thin film into a fine wire so that light can be wave-guided through the Si wire. After which dopant is injected into the Si wire so as to obtain a p-type/n-type semiconductor junction. And after, $SiO_2$ is deposited to provide a light clad layer, then electrode formation are performed.

This process requires the optical waveguide to be designed and machined so as to achieve a low light loss. Thus, the p-type/n-type semiconductor must be doped and the electrode must be prepared so as to minimize the light loss and to minimize the reflection and loss of a high-speed electric signal.

FIG. 1 is a cross-sectional view illustrating an optical waveguide as a base of a conventional Si optical modulator. In FIG. 1, it is assumed that light propagates in a direction vertical to the paper. This Si optical modulator has an optical waveguide configured by an Si layer 2 sandwiched between upper and lower $SiO_2$ clad layers 3 and 1. The Si layer 2 has, at the center of the drawing, an Si fine wire unit for the purpose of confining light. The Si fine wire unit has a cross-sectional structure called as a rib waveguide having a different thickness from that of the periphery.

The center of this Si layer 2 is a Si layer 201 having a thick thickness. The Si layer 201 is an optical waveguide core having a refractive index different from the $SiO_2$ clad layers 1 and 3 at the periphery to confine light propagating in the direction vertical to the paper, thereby configuring an optical waveguide 7.

The optical waveguide 7 is interposed between slab regions 202 at both sides and has a high concentration p-type semiconductor layer 211 and a high concentration n-type semiconductor layer 214. The optical waveguide 7 has, at the center of the core, a pn junction structure consisting of an intermediate concentration p-type semiconductor layer 212 and an intermediate concentration n-type semiconductor layer 213 formed by doping. From the both left and right ends of FIG. 1, a modulation electric signal and a bias are applied.

The pn junction structure formed by the intermediate concentration p-type semiconductor layer 212 and the intermediate concentration n-type semiconductor layer 213 also may have a pin structure sandwiching an undoped i-type (intrinsic) semiconductor not shown.

The optical waveguide 7 allows light to propagate therein so as to move along this pn junction (the direction vertical to the paper). Although not shown in FIG. 1, metal electrodes connected to the high concentration semiconductor layers 211 and 214 at both ends can be provided. These metal electrodes are used to apply, to a pn junction unit, a modulation electric signal of an RF (radio frequency) and a reverse bias electric field (an electric field from the right side to the left side in FIG. 1).

By the structure as described above, the carrier density in the interior of an optical waveguide core 201 can be varied to change the refractive index of the optical waveguide (carrier plasma effect), thereby modulating the phase of light.

The size of the waveguide depends on the refractive index of material used for a core/clad, and thus cannot be determined uniquely. The rib-type silicon waveguide structure as shown in FIG. 1 that has the optical waveguide core part 201 and the slab regions 202 at both sides has, as an example of the size including a waveguide core, a width of 400 to 600 (nm)×a height of 150 to 300 (nm)×a slab thickness of 50 to 200 (nm)×and a length of about a few (mm).

These Mach-Zehnder optical modulators using the optical waveguide as described above include, as conventionally-known, two-types of structures called a single electrode type and a dual electrode type. They are classified based on the difference of the electrode structure.

These electrodes are provided along two optical waveguides constituting two arms of a Mach-Zehnder optical modulator. These electrodes consist of two RF electrodes for applying a pair of differential signal voltages for modulation and at least one fixed potential electrode for applying a fixed potential.

In the case of the single electrode type structure, one fixed potential electrode is provided between the two RF electrodes to apply a DC bias potential, and thus is called a DC electrode. In the case of the dual electrode type structure, fixed potential electrodes are provided between the two RF electrodes and at the both outer sides of the two RF electrodes to apply a 0 Volt ground potential (grounding potential), and thus are called ground (GND) electrodes.

Conventional Single Electrode Type Mach-Zehnder Modulator

FIG. 2 is a plan view illustrating a Si optical modulator of a conventional single electrode type Mach-Zehnder modulator. FIG. 3 illustrates a cross-sectional view taken at III-III of FIG. 2 (see for example NPL 2).

In the plan view of FIG. 2, the input light from the left side is branched by optical waveguides 7a and 7b. Branched lights are phase-modulated by the modulation electric signal (RF signal) applied between upper and lower RF electrodes 5a, 5b and a center DC electrode 6. Phase-modulated lights are subsequently coupled and the resultant modulated light is outputted through the right end, thereby constituting a single electrode type Mach-Zehnder modulator.

The cross-sectional view of FIG. 3 taken at III-III line in FIG. 2 shows a basic structure in which two optical waveguides having a cross-sectional structure similar to that of FIG. 1 are arranged symmetrically in the left-and-right direction.

On the clad layer 3, at both of the left and right side ends, two radio frequency lines (RF electrodes 5a and 5b) to input one pair of differential modulation electric signals (RF signals) are provided. In the center of the clad layer 3, the DC electrode 6 to apply a common bias voltage is provided.

The two RF electrodes 5a and 5b have therebetween the Si layer 2 including the two optical waveguides 7a and 7b interposing the DC electrode 6. The optical waveguides 7a and 7b have pn junction structures formed symmetrically in the left-and-right direction. The RF electrodes 5a and 5b are electrically connected to the high concentration p-type semiconductor layer 211 by way of a via 4 (penetration electrode), respectively.

The DC electrode 6 is similarly connected to the high concentration n-type semiconductor layer 214 at the center. When the DC electrode 6 is applied a positive voltage relative to the RF electrodes 5a and 5b, a reverse bias can be applied to the two left and right pn junction units. In the following section, it is assumed that these electrodes and semiconductor layers are similarly electrically connected by way of one or plurality of via(s) 4.

FIG. 4(a) illustrates a doping status of the semiconductor in the cross section III-III and FIG. 4(b) illustrates a band level diagram during light modulation.

The Si optical modulator of the single electrode type has the following merits. Specifically, because a reverse biases are applied to the pn junctions, the RF electrodes and the DC electrode are electrically independent, thus eliminating the need of actively applying bias voltages to the RF electrodes. This consequently advantageously provides a simpler configuration not requiring a bias tee circuit for applying a bias to the RF electrode, or a capacitor for DC block between a driver IC and a RF electrode for example.

In the above description, an example has been described in which the RF electrode is abutted to the p-type semiconductor layer while the DC electrode is abutted to the n-type semiconductor. However, a reverse configuration also may be used in which the RF electrode is abutted to the n-type semiconductor layer while the DC electrode is abutted to the p-type semiconductor layer. In this case, a bias voltage applied to the DC electrode can be a negative voltage relative to the RF electrode to thereby applying reverse biases to the pn junction units.

Conventional Dual Electrode Type Mach-Zehnder Modulator

FIG. 5 is a plane view illustrating a Si optical modulator of a conventional dual electrode type Mach-Zehnder modulator. FIG. 6 illustrates a partial cross-sectional view taken along VI-VI line in FIG. 5.

In the plan view of FIG. 5, the input light from the left side is branched by the optical waveguides 7a and 7b. Branched lights are phase-modulated by the modulation electric signals (RF signals) applied to the upper and lower RF electrodes 15a and 15b. Phase-modulated lights are subsequently coupled to output the resultant modulated light through the right end, thereby constituting a dual electrode type Mach-Zehnder modulator.

The partial cross-sectional view shown in FIG. 6 taken along the VI-VI line in FIG. 5. FIG. 6 illustrates a cross section of a part having the optical waveguide 7a of a cross-sectional structure similar to FIG. 1. FIG. 6 also illustrates one of radio frequency lines (RF electrode 15a) to input a differential modulation electric signal (RF signal), and ground electrodes 16a and 16c interposing the RF electrode 15a. The RF electrode 15a and the ground electrode 16a have therebetween the Si layer 2 including the optical waveguide 7a in which a pn junction structure is formed. The clad layer 3 has thereon the RF electrode 15a and the ground electrode 16a. RF electrode 15a is electrically connected, by way of the via 4, to the high concentration n-type semiconductor layer 214, and ground electrode 16a is electrically connected, by way of the via 4, to the high concentration p-type semiconductor layer 211 of the Si layer 2.

In the case of this dual electrode type modulator, the ground electrode 16c provided at the center of FIG. 5 (the right side of FIG. 6) is not directly abutted to the semiconductor layer but is used to provide a ground potential. Thus, the RF electrode 15a and the ground electrodes 16a, 16c form a radio frequency transmission line having a GSG (Ground-Signal-Ground) structure. This structure can be used to adjust the characteristic impedance of the transmission line and to improve the transmission characteristic. Furthermore, the RF signal line surrounded by the ground electrodes can be used to form such an optical modulator that causes smaller signal leakage and that causes reduced crosstalk or propagation loss.

Although not shown in FIG. 6, the optical waveguide 7b has an electrode and a semiconductor area of similar structure. As can be seen from FIG. 5, a semiconductor area corresponding to the optical waveguide 7b is formed separately from a semiconductor area corresponding to the optical waveguide 7a. These regions are arranged in a symmetrical manner interposing the center line of the center ground electrode 16c in the up-and-down direction of FIG. 5 (or in the left-and-right direction of FIG. 6), and also have symmetrically arranged doping statuses.

The Si optical modulator as a radio frequency transmission line has a characteristic impedance that is significantly influenced by the capacitance of the pn junction unit of the Si layer. In the case of the dual electrode Si modulator, the capacitance between the RF electrode 15a and the ground electrode 16c can be adjusted to thereby change the characteristic impedance in a relatively easy manner to achieve about 50 Ohm in the single end and about 100 Ohm in the differential driving.

In the case of the dual electrode type Si optical modulator as described above, DC bias voltages are to be applied in a superposed manner to the RF electrodes, thus requiring, when compared with the single electrode type Si modulator, a bias tee circuit for the connection to the driver IC. However, as described above, the control of the capacitance between the RF electrode 15a and the ground electrode 16c provides an advantage that the characteristic impedance can be changed in a relatively easy manner. The dual electrode type thereby provide, together with the existence of the surrounding ground electrode, such an optical modulator that causes a smaller signal leakage and reduced crosstalk and propagation loss.

In the above description, an example has been described in which the RF electrode is abutted to the n-type semiconductor layer while the ground electrode is abutted to the p-type semiconductor layer. However, a reverse configuration also may be used in which the RF electrode is abutted to the p-type semiconductor layer while the ground electrode is abutted to the n-type semiconductor layer. In this case, a bias voltage applied together with the RF signal to the RF electrode can be a reverse bias to the pn junction unit by applying a negative voltage relative to the ground electrode.

CITATION LIST

Non Patent Literature

NPL 1: Goi Kazuhiro, Oda Kenji, Kusaka Hiroyuki, Ogawa Kensuke, Tsung-Yang Liow, Xiaoguang Tu, Guo-Qiang Lo, Dim-Lee Kwong, "20 Gbps binary phase shift keying using silicon Mach-Zehnder push-pull modulator", The Institute of Electronics Information and Communication Engineers Electronics Society Convention 2012, C-3-50, 2012.

NPL 2: Po Dong, Long Chen, and Young-kai Chen, "High-speed low-voltage single-drive push-pull silicon Mach-Zehnder modulators", Opt. Express vol. 20, no. 6, pp. 6163-6169, 2012.

SUMMARY OF INVENTION

In order to provide a light modulation signal that has a high waveform quality and that achieves a long distance transmission, such an optical modulator is required that can generate a modulation signal including less chirp. The chirp of the MZ-type optical modulator mainly means the signal distortion in the modulated output light. The chirp distortion is caused when there is a difference between the two signal lights of the optical waveguides in a phase modulation unit in the amount of phase change or light loss.

FIG. 7A shows a Constellation Map when there is no chirp distortion. FIG. 7B shows a Constellation Map when there is a chirp distortion. These drawings illustrate the relation of the change in the phase and the amplitude of lights. When the electric modulation signal is changed, two lights having passed the optical waveguides 7a and 7b of the MZ-type optical modulator, and an output light from the optical modulator obtained by multiplexing the lights from the optical waveguides 7a and 7b change as shown, respectively.

As shown in FIG. 7A, when the phase change efficiencies in the two optical waveguides 7a and 7b are equal, then the output light from the optical modulator moves on the Constellation Map in a straight manner from a status of phase 0 to phase π.

Contrary as shown in FIG. 7B, when the phase change efficiencies in the two optical waveguides 7a and 7b are different, then the output light from the optical modulator moves on the Constellation Map in a trajectory that is not straight and the phase status after the modulation also shows a offset from phase 0 and π. When the optical waveguides 7a and 7b have a difference in the light loss, an offset is similarly caused between the amplitudes, thus causing the output light from the optical modulator moving on the Constellation Map to draw a trajectory that is not straight. The offset of the phase or the amplitude results in chirp distortion.

In the manufacturing step of the Si optical modulator, the light modulation characteristic may be deteriorated if an implantation step for injecting p-type/n-type dopant into an Si layer causes an offset in the position of the pn junction due to a mask offset, for example.

In the manufacturing step of the Mach-Zehnder modulator, if the offset in the position of the pn junction is caused due to the mask offset as described above (offset in the up-and-down direction in FIG. 2 or in the left-and-right direction in FIG. 3 for example), then because the two optical waveguides constituting the Mach-Zehnder modulator have a symmetric doping structure, thus one waveguide has a large p-type layer while the other waveguide has a small p-type layer for example. In this way, the two waveguides have different modulation efficiencies, thus causing the multiplexed modulated light signal having chirp distortion.

The usual mask alignment precision during the device manufacturing step is of about ±30 nm, thus generally causing the mask offset at such a level. An offset of a few dozens of nm is difficult even to measure. Thus, with a general manufacturing method, it is difficult to assure a production accuracy of ±50 nm or less.

FIG. 8A and FIG. 8B illustrate how the light signal quality is deteriorated due to the offset of the implantation mask as described above. FIG. 8A shows a Constellation Map of the entirety of deteriorated 64QAM modulation signals. FIG. 8B illustrates the definition of FoD (Figure of Deterioration) used as an index of the deterioration of the signal quality in such a map.

As shown in FIG. 8B, the FoD is defined using FoD=100× δ/Δ, where the distortion from the linearity of a symbol on the constellation is δ, and the minimum interval between symbols is Δ. The mask offset during the implantation can be set as offset amount (nm) and the value of the FoD at the time can be calculated as above to thereby enabling to compare the deterioration statuses of the signal quality.

FIG. 9(a) is a graph of the FoD values when the pn junction position is offset by the offset amount (nm) from a designed position. FIG. 9(b) shows a Constellation Map of the entirety of the 64QAM signal when the pn junction position is offset by 10 nm. FIG. 9(c) shows a Constellation Map of the entirety of the 64QAM signal when the pn junction position is offset by 30 nm. As can be seen from FIGS. 9(a) and 9(c), the 30 nm offset causes 30 percent or more of the symbol interval to be consumed by the S-like distortion in the constellation, showing a significant deterioration of the signal quality.

In the FoD graph of FIG. 9(a), values (w/lin.) shown by the black dots show values obtained by a compensation processing in a linearizer for another signal processing. Since the deterioration of the signal quality is significant, the compensation processing is substantially ineffective as shown by the comparison with before-compensation values (shown by white dots: wo/lin.).

The present invention has been made in view of the problem as described above. It is an objective of the invention to provide an optical modulator that suppresses the chirp due to the mask offset for example during the phase modulation and that provides a high waveform quality.

In order to achieve the objective as described above, the present invention is characterized in including a configuration as described below.

Configuration 1 of the Invention

An optical modulator, comprising: two RF electrodes for applying one pair of differential signal voltages; at least one fixed potential electrode for applying a fixed potential; a first conductive semiconductor layer and a second conductive semiconductor layer abutted to the RF electrode or a fixed potential electrode; and a light modulation unit including two optical waveguides branched from one optical waveguide that are arranged along a pn junction unit functioning as a boundary between the first and second conductive semiconductor layers, wherein:
the semiconductor layers and the electrode are provided so that the integration amounts of the phase changes caused by the offsets of the positions of the pn junction units in the two optical waveguides from a design value is equal between the two optical waveguides.

Configuration 2 of the Invention

The optical modulator according to Configuration 1, wherein: the modulation unit of the optical modulator in the two optical waveguides has a positional relation of a semiconductor doping status matching between the respective optical waveguides.

Configuration 3 of the Invention

The optical modulator according to Configuration 1 of the invention, wherein:
the modulation unit of the optical modulator has a first region positioned at the input side of a light propagation direction and a second region positioned at the output side,
the connection of the first region and the second region has a structure having a multi-level crossing of the RF electrodes and the optical waveguides, and
the two optical waveguides both have the positional relation of the semiconductor doping status in the first region and the second region that is provided in a reversed position viewed in the light propagation direction in the respective optical waveguides.

Configuration 4 of the Invention

The optical modulator according to Configuration 3 of the invention, wherein: the first region has the entire length in the light propagation direction that is shorter than the entire length of the second region in the light propagation direction.

Configuration 5 of the Invention

The optical modulator according to Configuration 3 of the invention, wherein: at least one of the first region and the second region is divided to two or more regions provided alternately in the light propagation direction.

Configuration 6 of the Invention

The optical modulator according to Configuration 5 of the invention, wherein:
the first region is divided to two regions so as to interpose the second region so that a length ratio of 1:2:1 is provided thereamong in the light propagation direction.

(Configuration 7 of the Invention)

The optical modulator according to any one of Configurations 1 to 6 of the invention, wherein:
the optical modulator is of a single electrode structure, and the fixed potential electrode comprises a DC electrode provided between two RF electrodes.

Configuration 8 of the Invention

The optical modulator according to any one of Configurations 1 to 6 of the invention, wherein:
the optical modulator is of a dual electrode structure, and the fixed potential electrode comprises at least one ground electrode provided between two RF electrodes and two ground electrodes provided at the outer side of two RF electrodes.

The optical modulator of the present invention is configured so that the offset of the pn junction position (offset amount) due to the mask offset during the implantation is provided so as to provide a uniform influence on the modulation efficiencies of the two waveguides constituting a Mach-Zehnder modulator. Thus, an optical modulator having a good signal quality can be realized.

Furthermore, the division to the first region the second region can provide the cancellation between positive and negative portions, thus allowing the two waveguides to have a reduced difference between the modulation efficiencies.

The attenuation due to the propagation loss of a radio frequency electric signal causes different modulation efficiencies between the input side and the output side of an RF electrode. To solve this problem, the RF electrode of the first region and the second region are allowed to have appropriately-set different lengths, thus realizing an optical modulator having symmetric modulation efficiencies. This can consequently provide an optical modulator that suppresses the chirp distortion during the light modulation and that has a high waveform quality.

BRIEF DESCRIPTION OF DRAWINGS

FIGS. 9($b$) and 9($c$) are Constellation Maps in the case of two offset values;

DESCRIPTION OF EMBODIMENTS

The following section will describe an embodiment of an Si optical modulator obtained by applying the present invention to Mach-Zehnder modulators having a single electrode and a dual electrode structure.

Embodiment of a Mach-Zehnder Modulator Having a Single Electrode Structure

First, the following section will describe in detail an embodiment of a Mach-Zehnder modulator having a single electrode structure using some preferred examples.

Example 1

Figure 10:
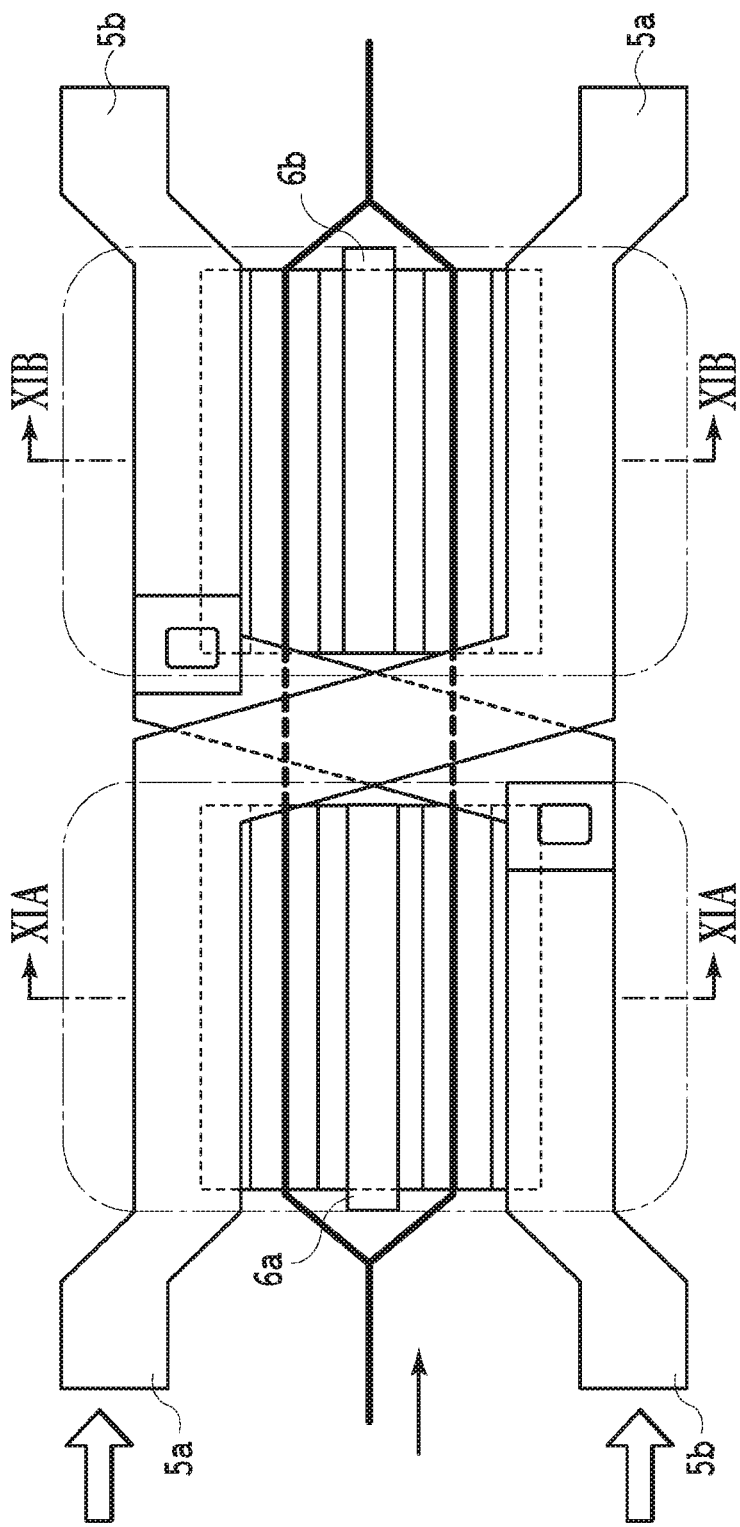
FIG. 10 is a plan view illustrating the configuration of the Mach-Zehnder optical modulator having a single electrode structure according to the first embodiment of the present invention.

FIG. 10 is a plan view illustrating the configuration of a Mach-Zehnder optical modulator having a single electrode structure according to the first embodiment of the present invention.

As shown in FIG. 10, the optical modulator according to Example 1 of the present invention is configured so that the modulation unit thereof is divided to a first region positioned at the input side of a light propagation direction of an optical waveguide (a part having a cross section XIA-XIA surrounded by the long dashed short dashed line) and a second region positioned at the output side (a part having a cross section XIB-XIB surrounded by the long dashed short dashed line).

The two regions have semiconductor doping statuses (the conductivity or the polarity of the semiconductor such as p-type/n-type) that are doped by the same pattern layout in a reversed type (e.g., so that a p-type part in the first region corresponds to an n-type part in the second region, and the n-type part corresponds to the p-type part).

The two upper and lower RF electrodes 5a and 5b for applying one pair of differential signal voltages are connected so as to have a multi-level crossing (or three-dimensional intersection) to each other at the intermediate part of the first region and the second region at the left and right sides without contacting each other. For example, as shown by the X-like wiring shown at the center of FIG. 10, the RF electrode 5a is directly connected from the upper-left side to the lower-right side. On the other hand, the RF electrode 5b is firstly connected to a lower layer than the RF electrode 5a by way of a via (penetration electrode), and is subsequently connected from the lower-left side to the upper-right side in the lower layer, and is subsequently connected to the original upper layer by way of the via again.

The connection of the first region and the second region has RF electrodes and optical waveguides intersecting each other. The optical waveguides and the RF electrodes are originally configured in different layers. Thus, no influence is caused by this intersection on the manufacture of the optical waveguides.

The DC electrodes 6a and 6b for applying bias voltages located between the two RF electrodes are provided in the two regions of reversed doping statuses, and thus require being applied different bias voltages of different polarities. Thus, the first region and the second region are electrically separated and are independent.

Figure 1:
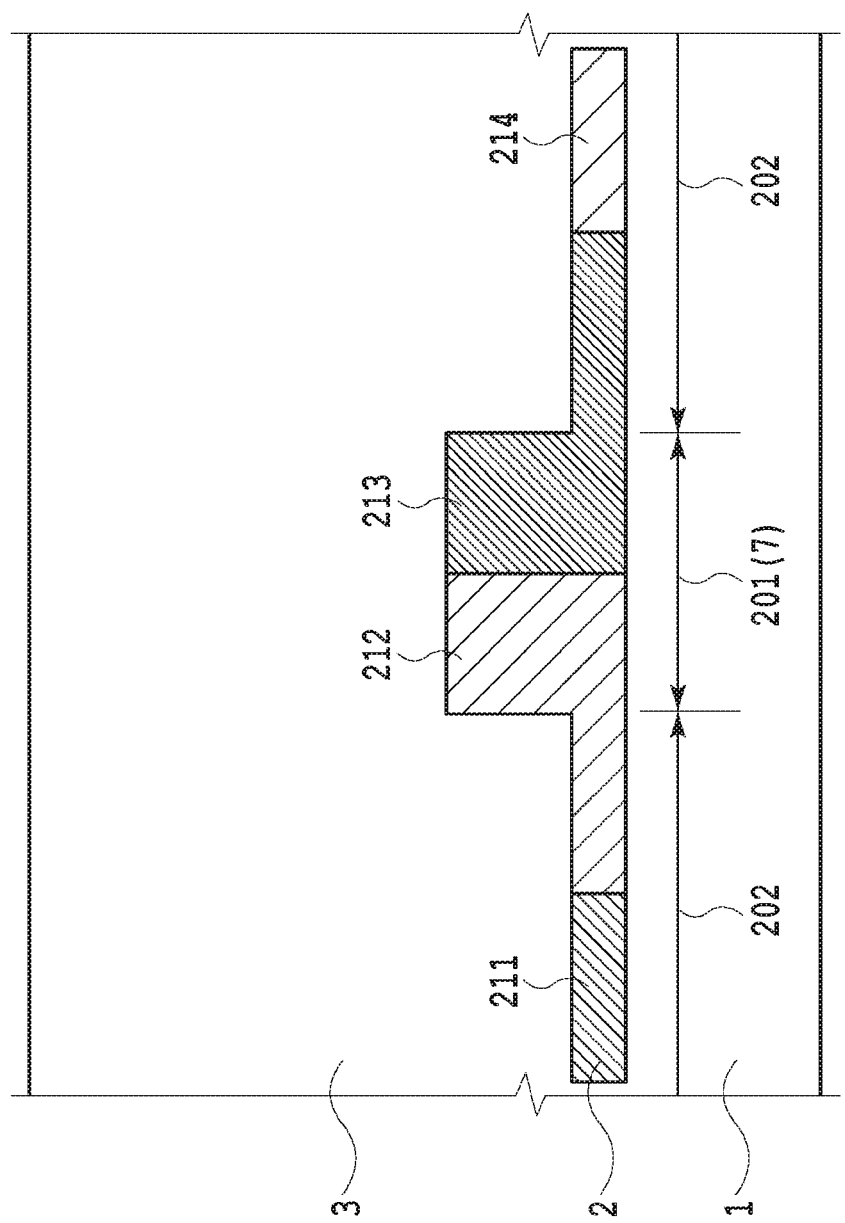
FIG. 1 is a cross-sectional view illustrating an optical waveguide of a conventional Si optical modulator.
Figure 2:
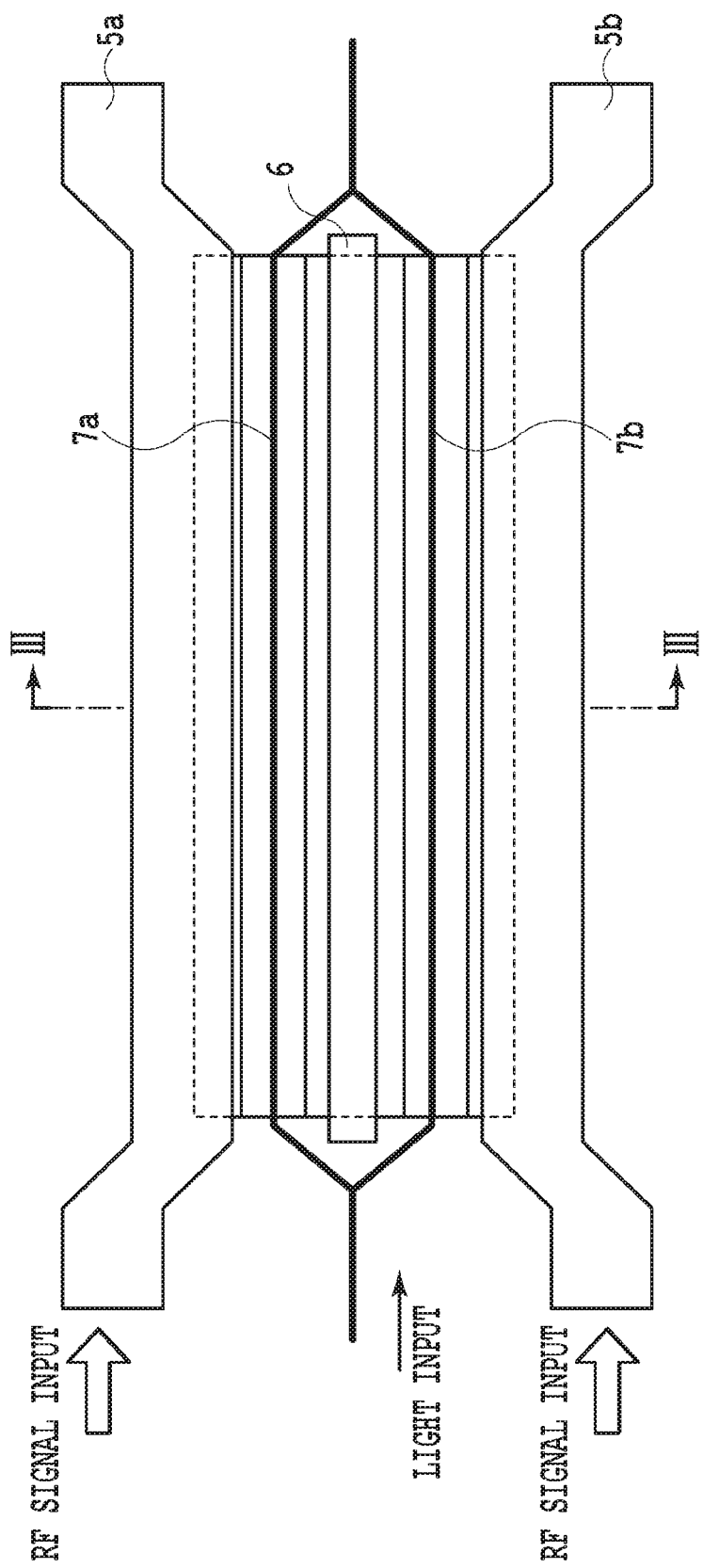
FIG. 2 is a plan view illustrating a Si optical modulator constituting a conventional single electrode-type Mach-Zehnder modulator.
Figure 3:
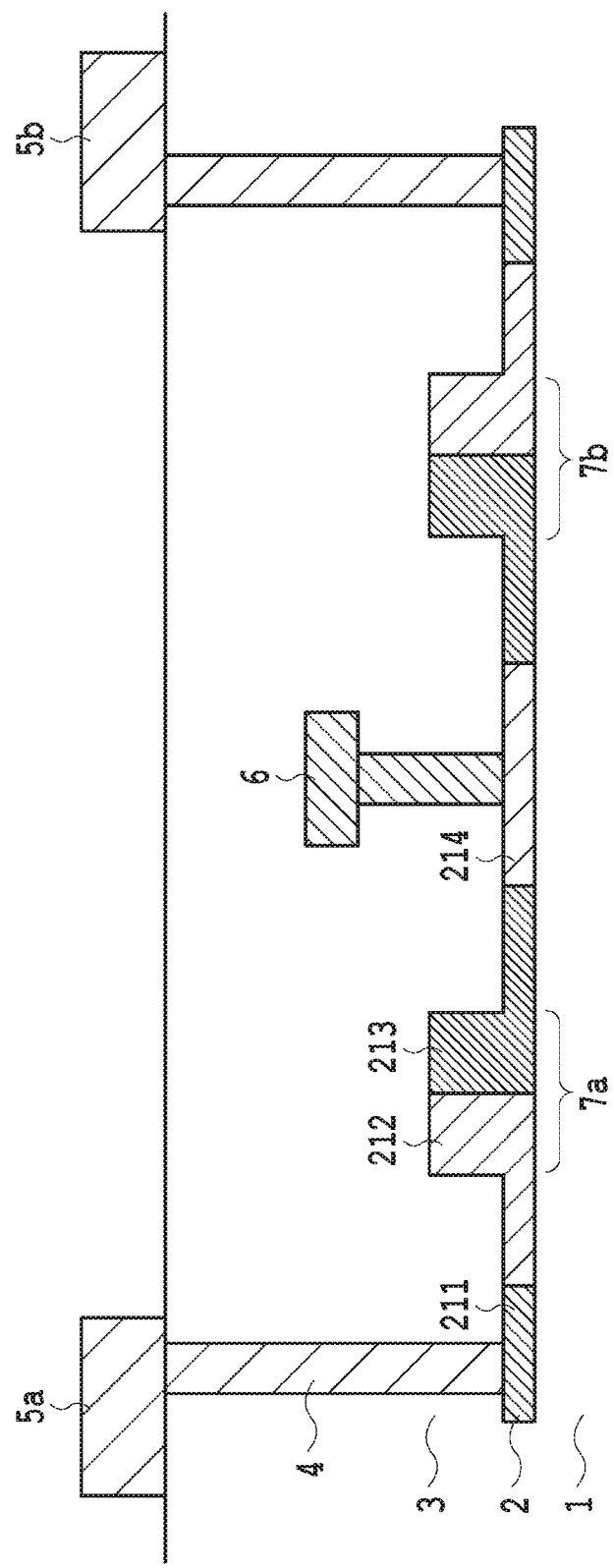
FIG. 3 is cross-sectional view taken at III-III of the Si optical modulator in FIG. 2.
Figure 4:
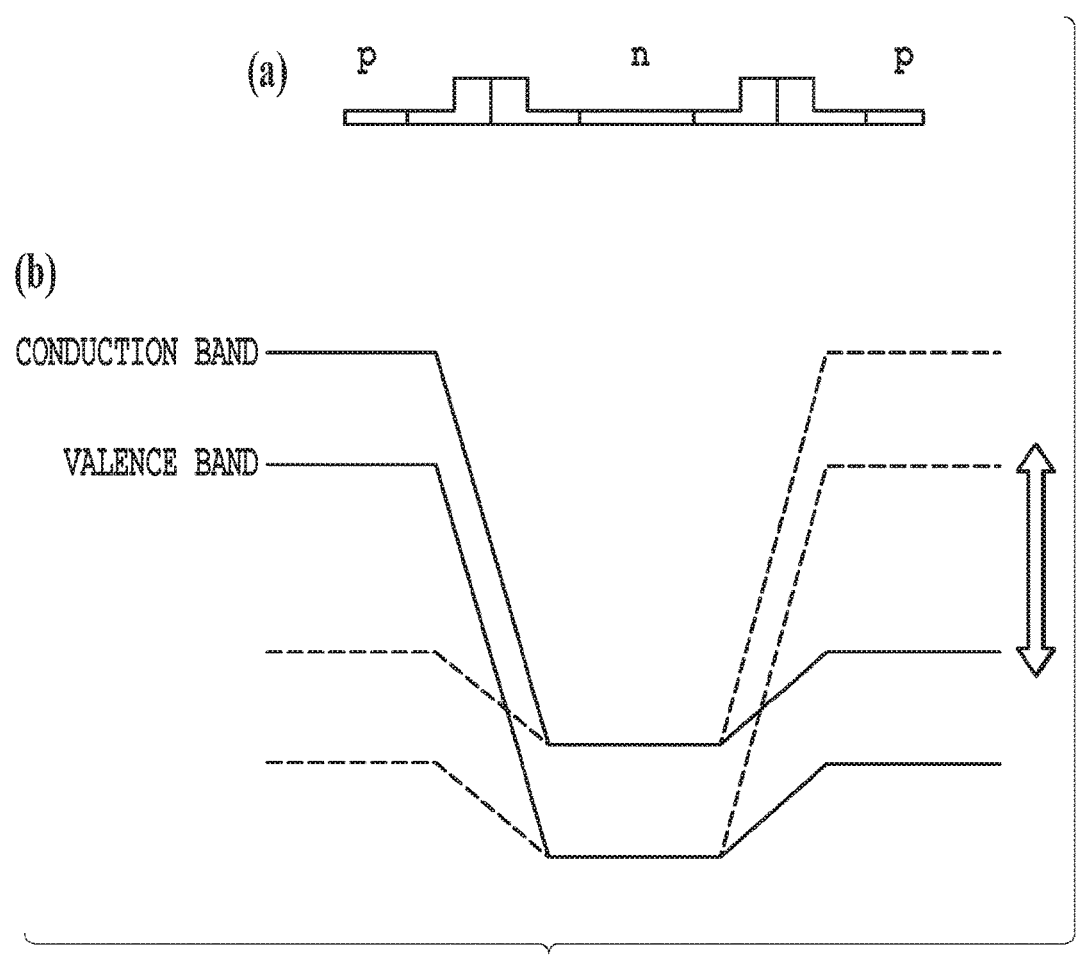
FIG. 4 illustrates the doping status of the semiconductor in the cross section of the Si optical modulator in FIG. 2 and a band diagram during the light modulation.
Figure 5:
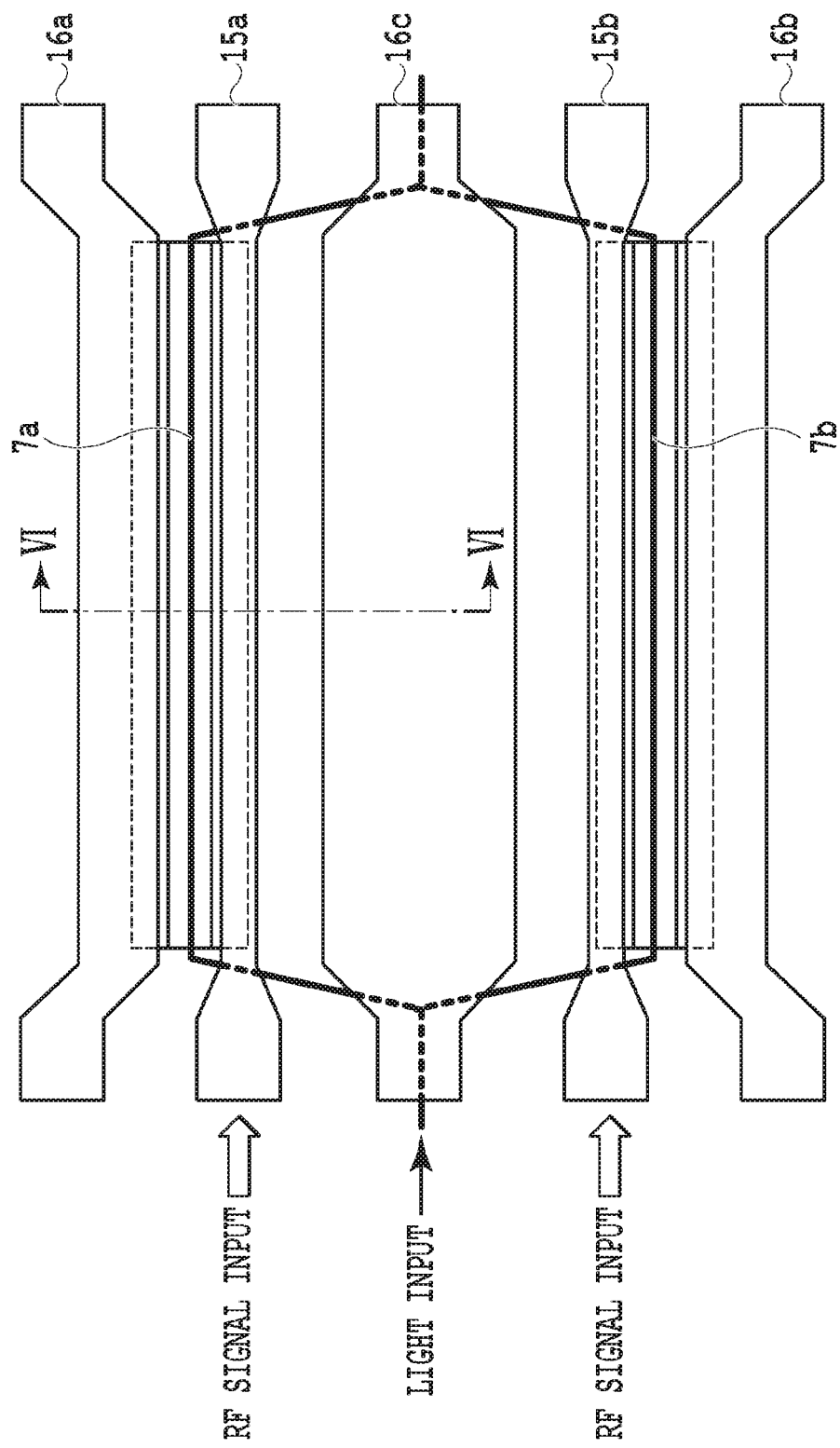
FIG. 5 is a plan view illustrating the Si optical modulator constituting a conventional dual electrode type Mach-Zehnder modulator.
Figure 6:
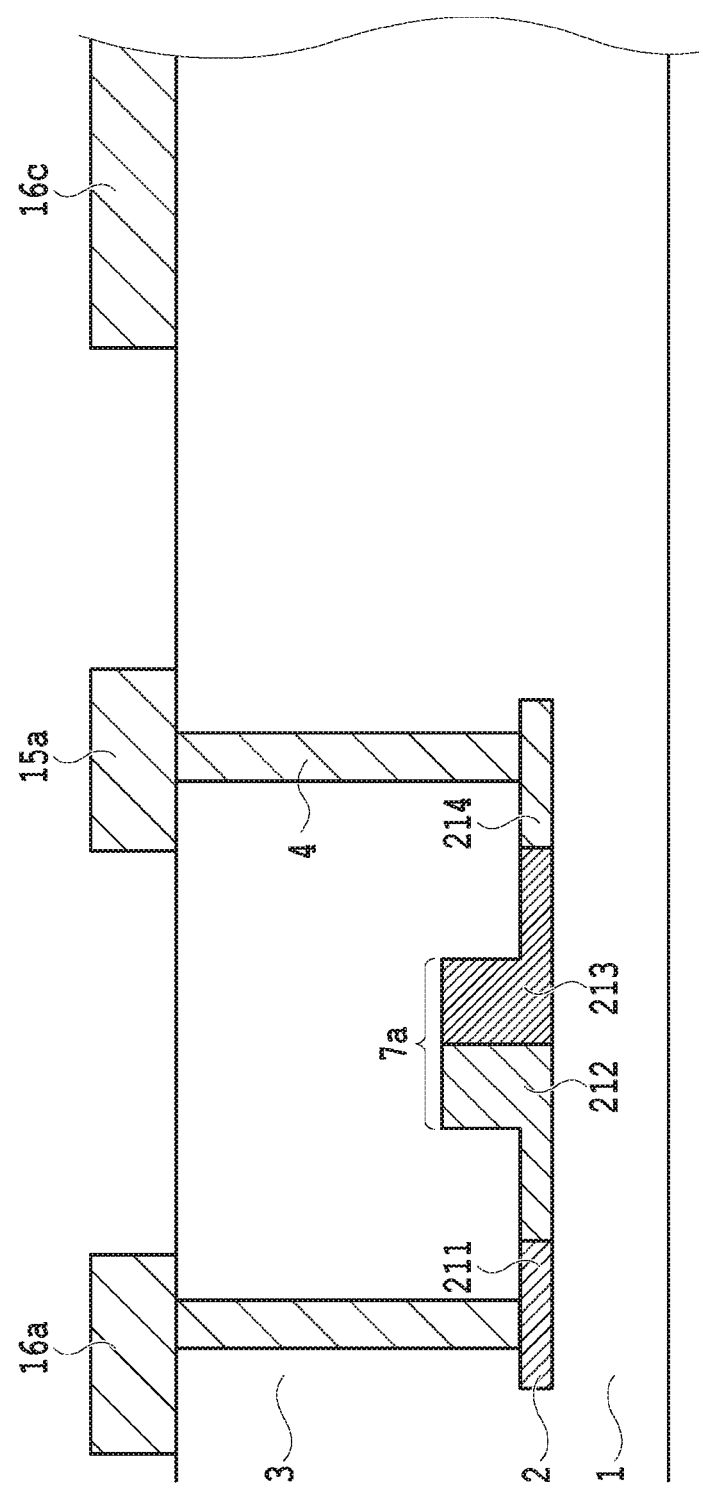
FIG. 6 is a cross-sectional view taken at VI-VI of the Si optical modulator in FIG. 5.
Figure 7A:
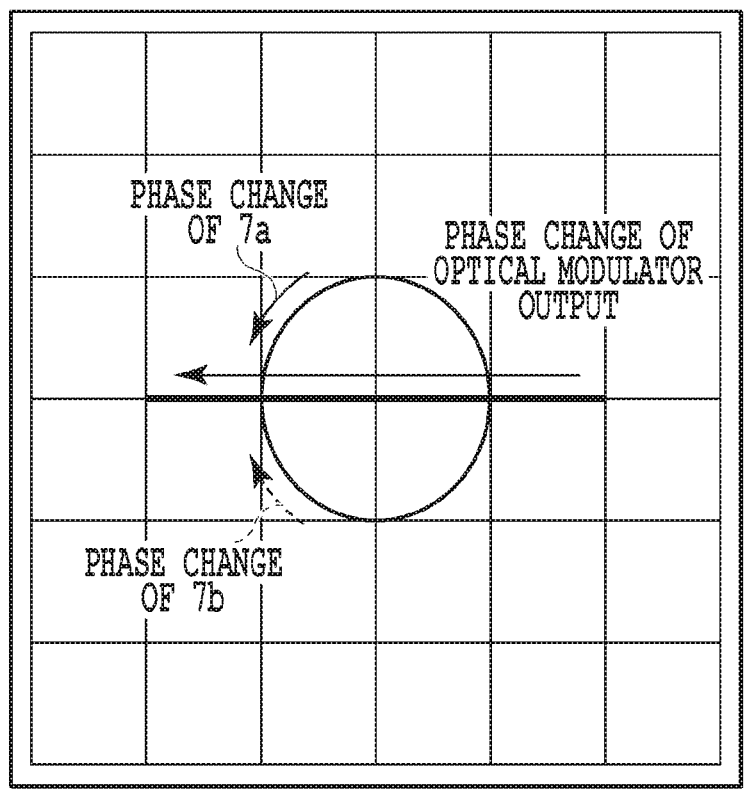
FIG. 7A illustrates a Constellation Map when there is no chirp distortion in the MZ-type optical modulator.
Figure 7B:
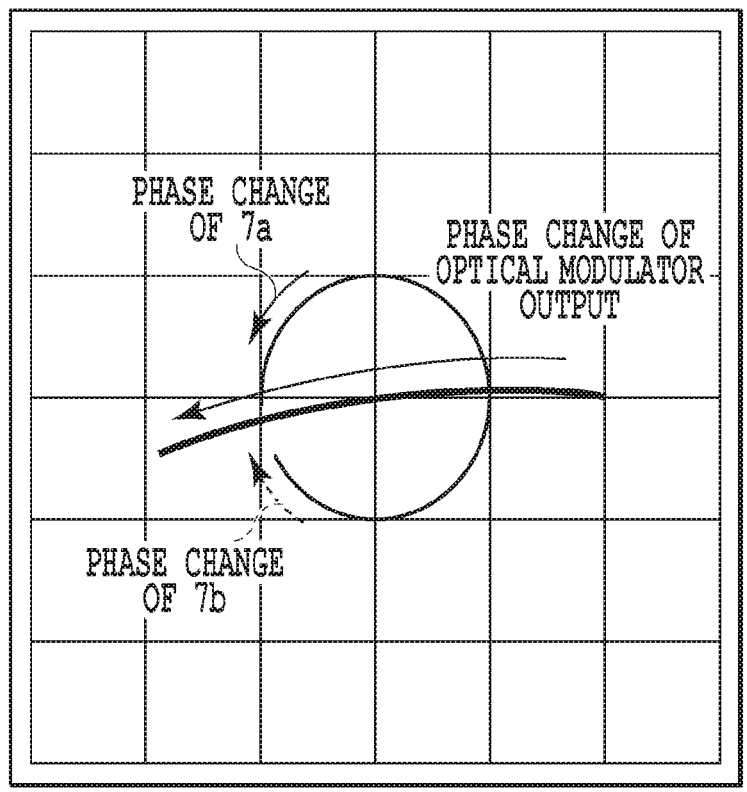
FIG. 7B illustrates a Constellation Map when there is chirp distortion in the MZ-type optical modulator.
Figure 11A:
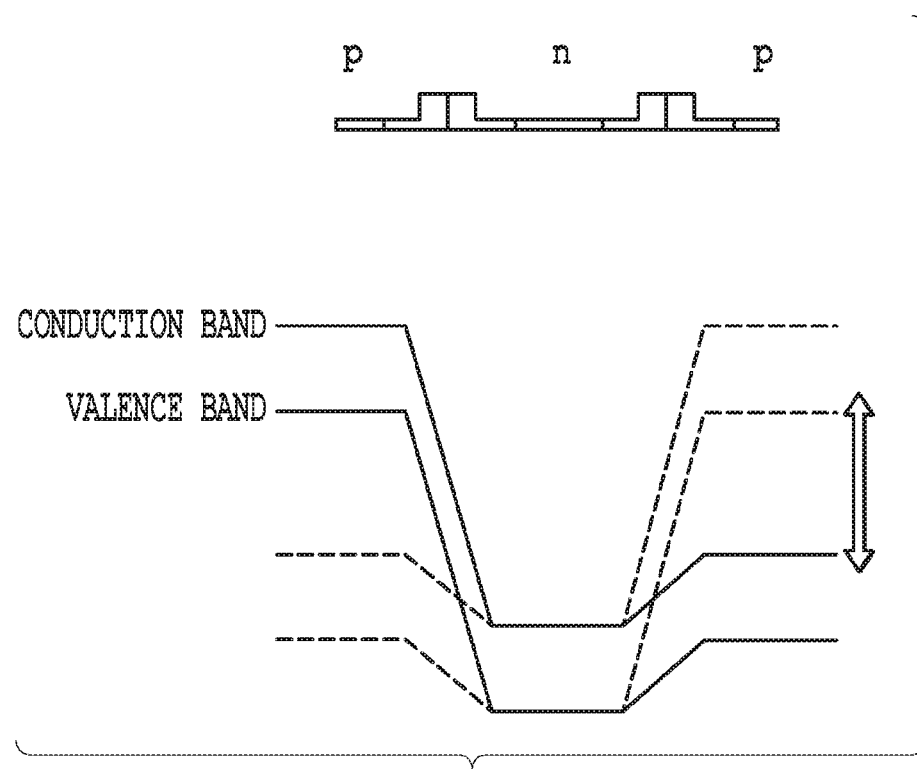
FIG. 11A shows the semiconductor doping status in the XIA-XIA cross section of FIG. 10 and a band diagram during the light modulation.
Figure 11B:
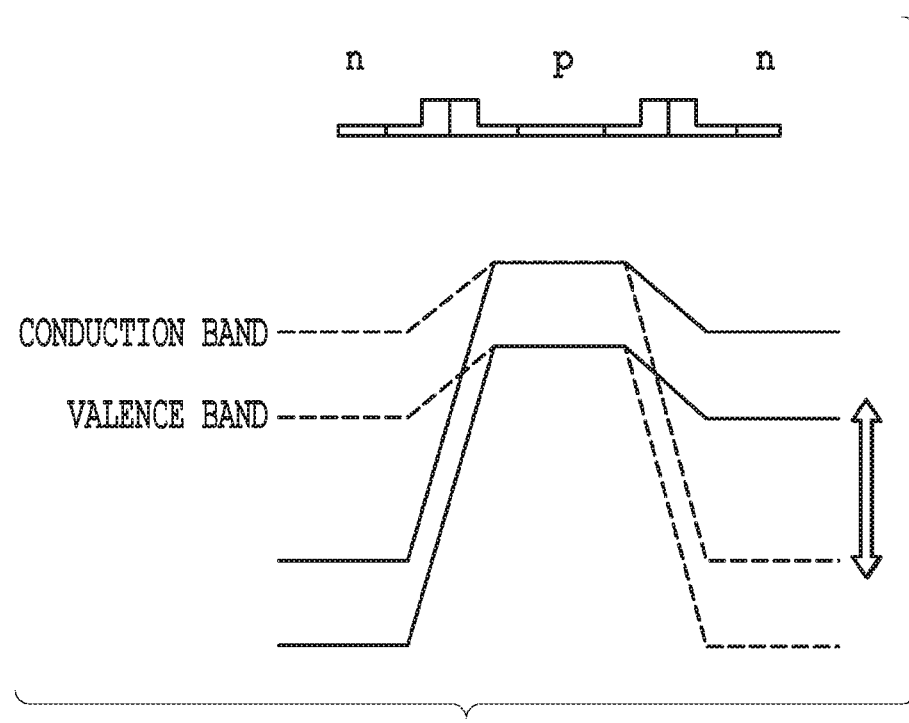
FIG. 11B shows the semiconductor doping status in the XIB-XIB cross section of FIG. 10 and the band diagram during the light modulation.

The optical waveguides in the two regions have cross-sectional structures as schematically shown in the upper sides of FIG. 11A and FIG. 11B. The optical waveguides basically have the same structure as that of FIG. 3 except for that the doping statuses (type of conductivities or polarities) are reversed. Specifically, the first region has the two RF electrodes 5a and 5b both abutted to the first conductive (e.g., p-type) semiconductor layer. The DC electrode 6a is abutted to the second conductive semiconductor layer having a reverse conductivity to the first conductivity (e.g., n-type to p-type).

The second region has the two RF electrodes 5b and 5a after the intersection that are both abutted to the second conductive (n-type) semiconductor layer. The DC electrode 6b is abutted to the first conductive (p-type) semiconductor layer.

The two pn junction units functioning as a boundary between the first and second conductive semiconductor layers include an Si optical waveguide to allow light to propagate therein, thereby providing an Si optical modulator having a single electrode structure.

As described above, the respective RF electrode of the two is electrically connected between the first region and the second region. The DC electrode is electrically separated between the first region and the second region as 6a and 6b, they are independent from each other. The two RF electrodes are configured to have a multi-level crossing to each other without being abutted each other between the first region and the second region.

The first and second regions are set to have lengths in the light propagation direction having a ratio of about ½ to the entire lengths thereof.

FIG. 11A and FIG. 11B illustrate the doping status of the semiconductor and the band diagram during the light modulation in the cross sections XIA-XIA and XIB-XIB of FIG. 10.

FIG. 11A shows the cross section XIA-XIA of the first region in FIG. 10, that is configured so that the two RF electrodes are both abutted to the p-type semiconductor layer, and are applied with a differential signal. The DC electrode is abutted to the n-type semiconductor layer. By applying a positive voltage to the DC electrode compared to the voltage applied to the RF electrodes, a reverse bias is applied to the pn junction unit.

FIG. 11B shows the cross section XIB-XIB of the second region in FIG. 10, that is configured so that the two RF electrodes are both abutted to the n-type semiconductor layer, and are applied with a differential signal. The DC electrode is abutted to the p-type semiconductor layer. By applying a negative voltage to the DC electrode compared to the voltage applied to the RF electrodes, a reverse bias is applied to the pn junction unit.

Each of the two RF electrodes has a continuous structure in which the RF electrode is electrically connected between the first region and the second region, respectively. Since the RF electrodes have a multi-level crossing between the first region and the second region without being abutted to each other, in the cross sections XIA-XIA and XIB-XIB, directions of applied voltages are reversed left and right. Thus, even when positive and negative reverse voltages are applied to the first region and the second region in the DC electrode, the pn junction unit provided in the optical waveguide is configured so that the second region receives a high voltage when the first region receives a high voltage, while the second region receives a low voltage when the first region receives a low voltage.

The Mach-Zehnder optical modulator is configured so that the carrier densities in the two optical waveguides are changed to change the refractive indexes of the respective waveguides to thereby modulate the light phase for light interference. This requires the phases to be changed in the same direction in all regions of an optical waveguide.

Figure 12:
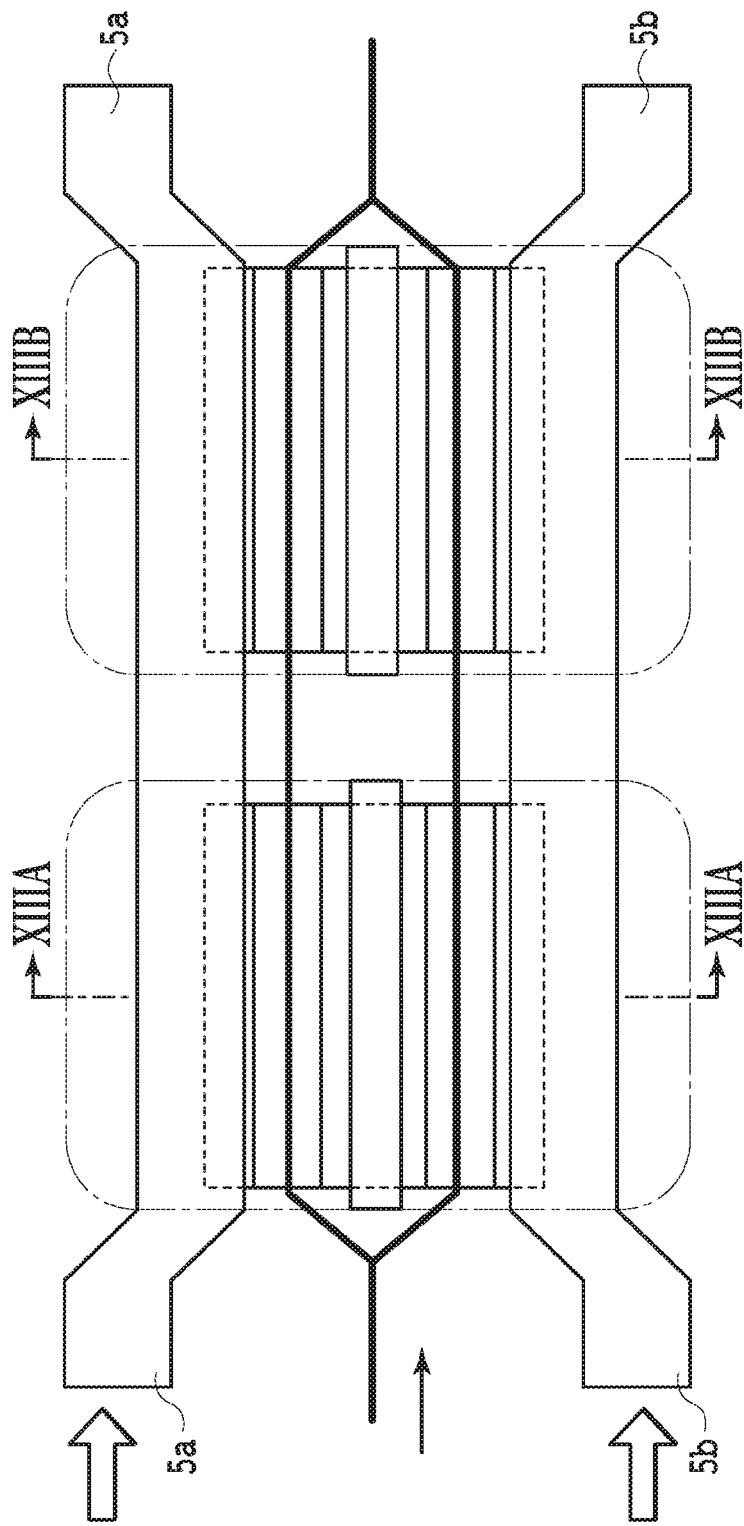
FIG. 12 is a reference drawing illustrating the optical modulator when there is no intersection of RF electrodes as in a conventional technique.
Figure 13A:
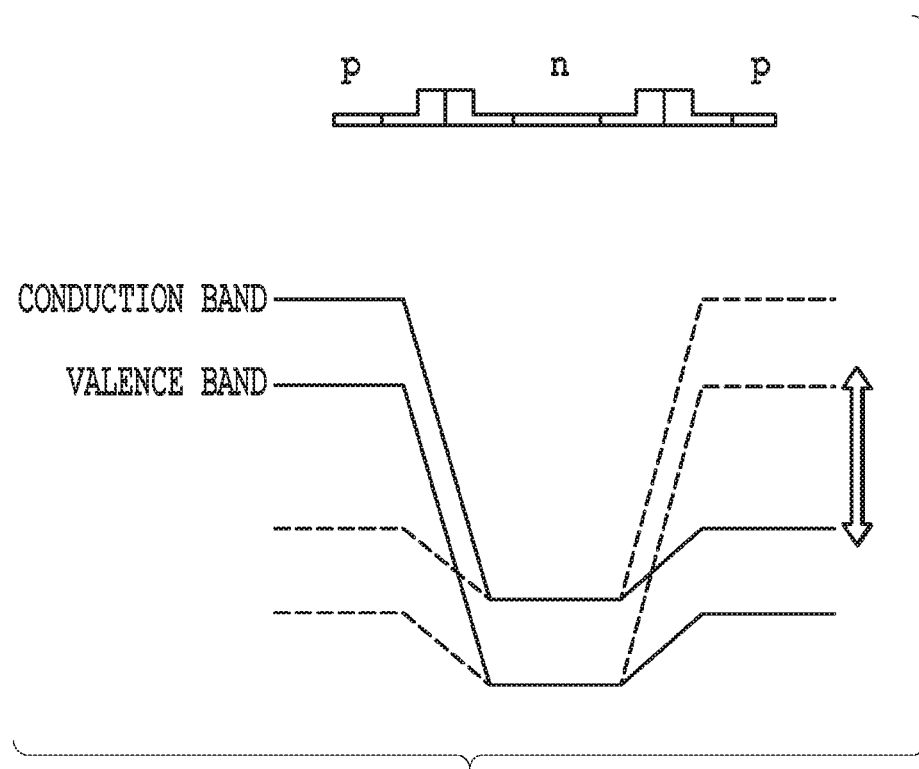
FIG. 13A shows the semiconductor doping status in the XIIIA-XIIIA cross section of the reference drawing of FIG. 12 and the band diagram during the light modulation.
Figure 13B:
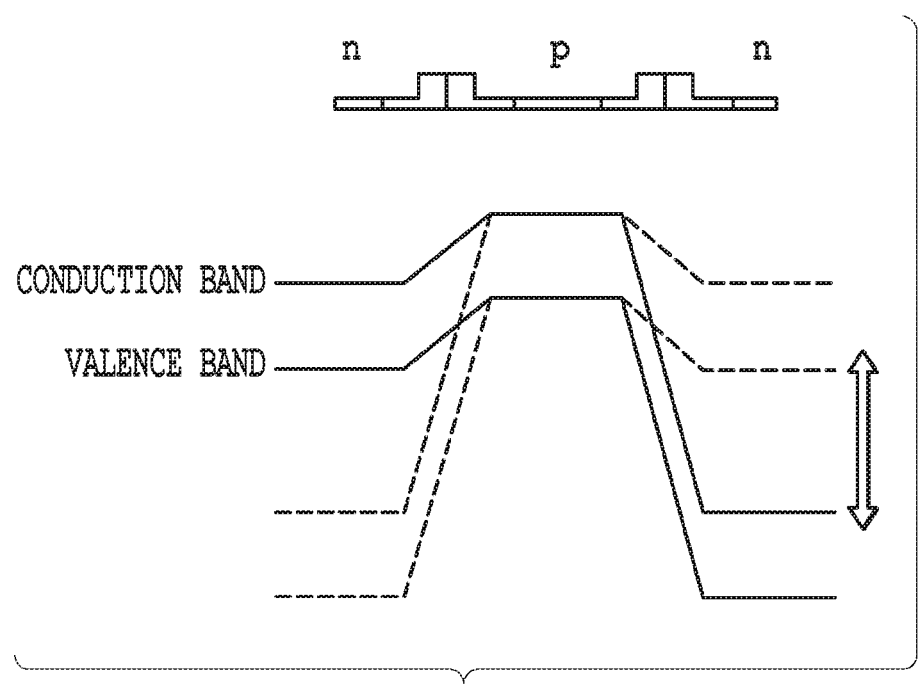
FIG. 13B shows the semiconductor doping status in the XIIIB-XIIIB cross section of the reference drawing of FIG. 12 and the band diagram during the light modulation.

For example, in the case of an optical modulator for reference shown in FIG. 12, the two regions have reverse doping statues and the RF electrodes do not intersect each other and the straight RF electrodes as in the conventional technique are used. This configuration disadvantageously causes the magnitude of the potential difference applied to the pn junction unit between the first region and the second region is reversed, thus cancelling the phase change difference between the two optical waveguides in all regions of the optical modulator (see FIG. 13A and FIG. 13B).

In order to avoid this, the structure as shown in FIG. 10 is required in which the RF electrodes are allowed to intersect each other with multi-level crossing, and the same potential difference is applied to the pn junction unit in the entire region of the optical waveguide.

Effect of Example 1 in Preventing the Characteristic Deterioration Caused by the Offset of the Implantation Mask The following section will describe the effect of preventing the characteristic deterioration caused by the offset of the implantation mask during the implantation process of the device manufacturing in the present invention.

According to the structure of Example 1, the offset of the pn junction position (offset amount) due to the mask offset during the implantation process can be cancelled by the positive and negative amount in the first and second region. Specifically, when the first region undesirably has an implantation mask offset so as to increase the p-type layer, then the second region has the same mask offset so as to reduce the p-type layer. Thus, the two waveguides constituting the Mach-Zehnder modulator have a reduced modulation efficiency difference, thus realizing an optical modulator having a good signal quality.

In Example 1, the first and second regions are each set to have lengths of about ½ of the entire lengths in the light propagation direction. In order to cancel the change of the modulation characteristic due to the pn junction position offset in the first region and the second region, the first region and the second region must have the modulation characteristic changes in reverse directions of an equal absolute value. This requires the first region and the second region to have a substantially-equal length. Thus, the respective regions are set to have lengths that are at a ratio of about ½ of the entire lengths thereof.

On the other hand, the radio frequency signal is attenuated while propagating in the RF electrode. Thus, when the reduction of the modulation efficiency due to the attenuation cannot be ignored, the first region positioned at the input side of the RF signal must have a length shorter than that of the second region positioned at the output side, in the light propagation direction. This can consequently cancel the change of the modulation characteristic due to the offset of the pn junction position by the first region and the second region. An appropriate ratio between the lengths depends on the attenuation amount of the RF electrode or a difference in the contact resistance between the electrode and the semiconductor layer of the first region and the second region. The ratio is generally about 1:3 to about 1:1. A cancelling effect in the change of the modulation characteristic caused by the pn junction position offset also can be confirmed by the length ratio within a range from 1:5 to 5:1.

In the description of Example 1, the first region includes the RF electrode abutted to the p-type semiconductor layer and includes the DC electrode abutted to the n-type semiconductor layer. However, the same effect also can be obtained by allowing the first region to include the RF electrode abutted to the n-type semiconductor layer and the DC electrode abutted to the p-type semiconductor layer.

The RF electrode is preferably formed by a wiring using metal having a low resistivity in order to prevent the attenuation of the radio frequency signal. However, the DC electrode is not limited to metal and also may be formed by a wiring using the conductivity of the semiconductor layer. In this case, the DC electrode does not extend over the entire region of the first region or the second region and also may be abutted to a part thereof.

Example 2

Figure 14:
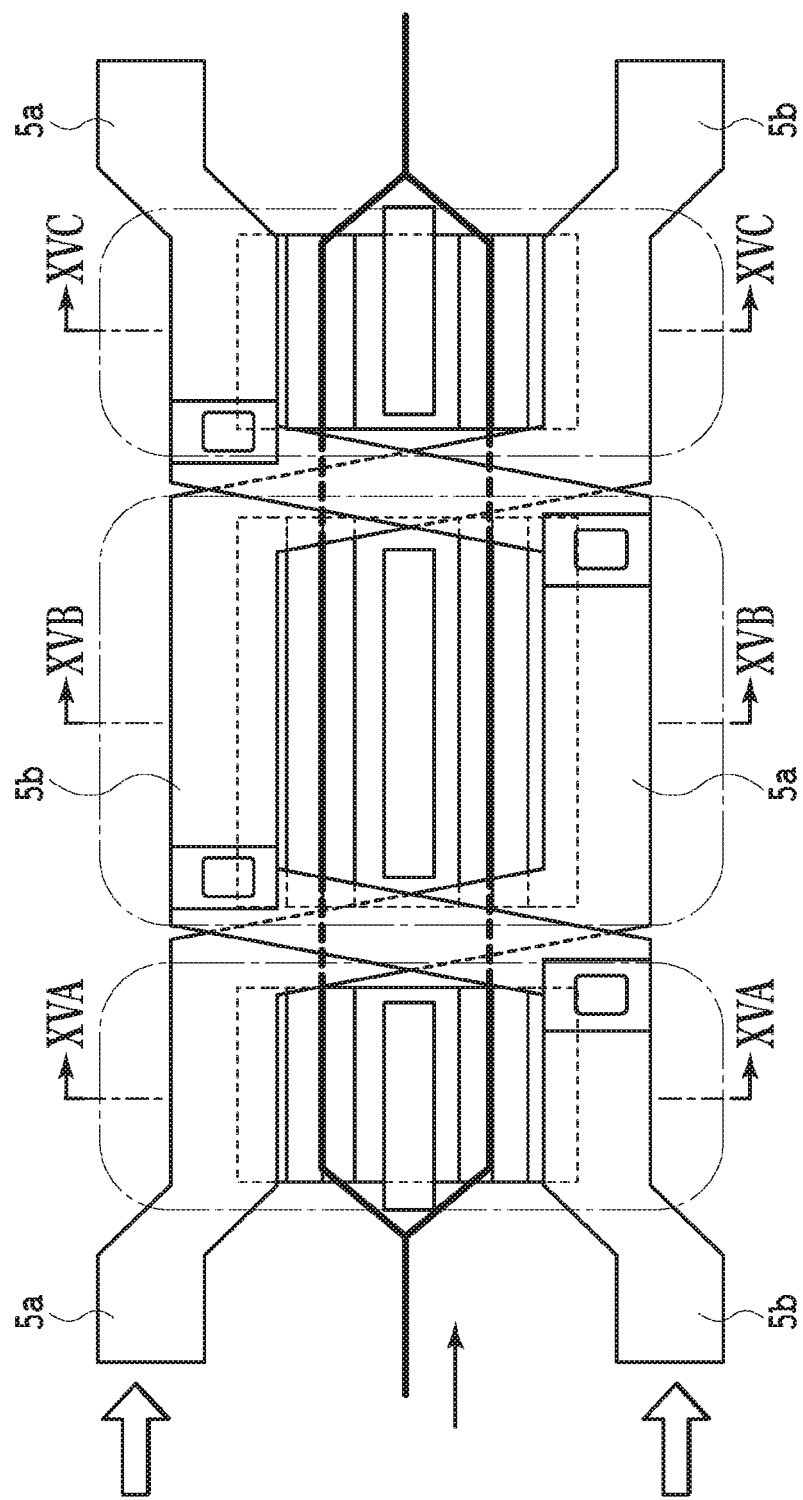
FIG. 14 is a plan view illustrating the configuration of a Mach-Zehnder optical modulator having a single electrode structure according to the second embodiment of the present invention.

FIG. 14 is a plan view illustrating the configuration of a Mach-Zehnder optical modulator having a single electrode structure according to the second embodiment of the present invention.

As shown in FIG. 14, the optical modulator according to Example 2 of the present invention has a modulation unit divided to three regions of a first region positioned at the input side of a light propagation direction of the optical waveguide (a part of the cross section XVA-XVA surrounded by the long dashed short dashed line), the other first region positioned at the output side (a part of the cross section XVC-XVC surrounded by the long dashed short dashed line), and a second region interposed by the two first regions (a part of the cross section XVB-XVB surrounded by the long dashed short dashed line). The first and second regions have reversed semiconductor doping statuses (semiconductor conductivities such as p-type/n-type). The two RF electrodes for applying one pair of differential signal voltages are multi-level crossing-connected in two places between the first region at the input side and the second region, and between the first region at the output side and the second region. DC electrodes for applying a bias voltage between the two RF electrodes are separately provided in the first region and the second region, respectively. The first region has the two RF electrodes both abutted to the first conductive (e.g., p-type) semiconductor layer and has the DC electrode abutted to the second conductive (e.g., n-type) semiconductor layer different from the first conductive semiconductor layer. The second region has the two RF electrodes both abutted to the second conductive semiconductor layer and has the DC electrode abutted to the first conductive semiconductor layer.

The two pn junction units functioning as a boundary between the first and second conductive semiconductor layers include an Si optical waveguide in which light propagates, thus providing an Si optical modulator having a single electrode structure.

Each of the two RF electrodes has a continuous structure in which the RF electrode is electrically connected between the first region and the second region, respectively. The DC electrodes are electrically separated in the first region and the second region, and are independent from each other. The two RF electrodes are configured to have two multi-level crossings without being abutted each other between two of the first regions and the second region. The first and second regions are set to have lengths of a ratio therebetween in the light propagation direction of about 1:2:1 for example.

Figure 15A:
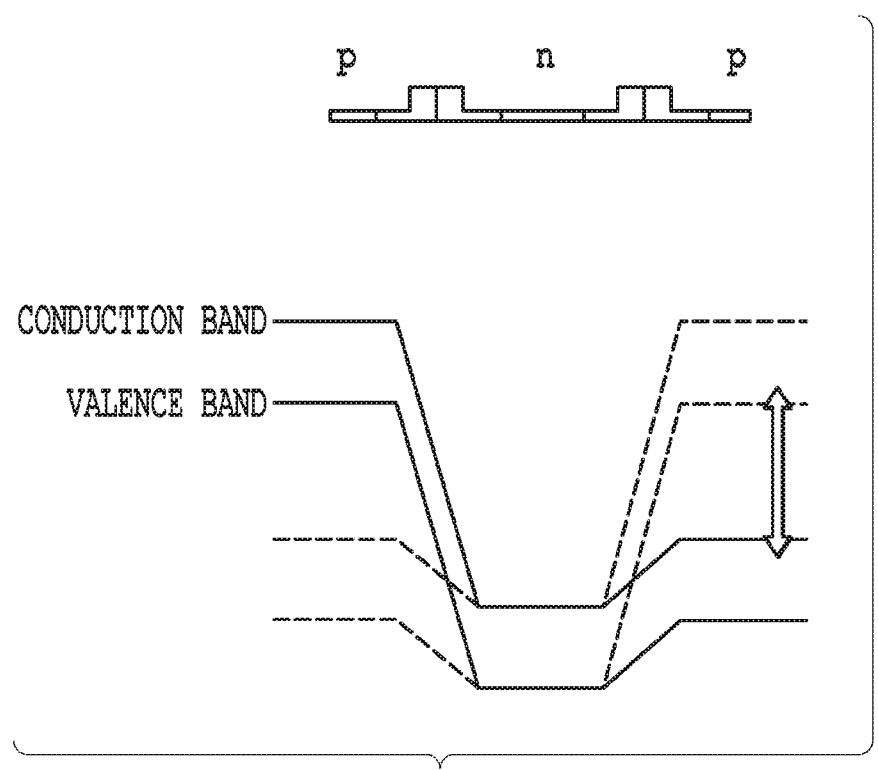
FIG. 15A shows the semiconductor doping status in the XVA-XVA cross section of FIG. 14 and a band diagram during the light modulation.
Figure 15B:
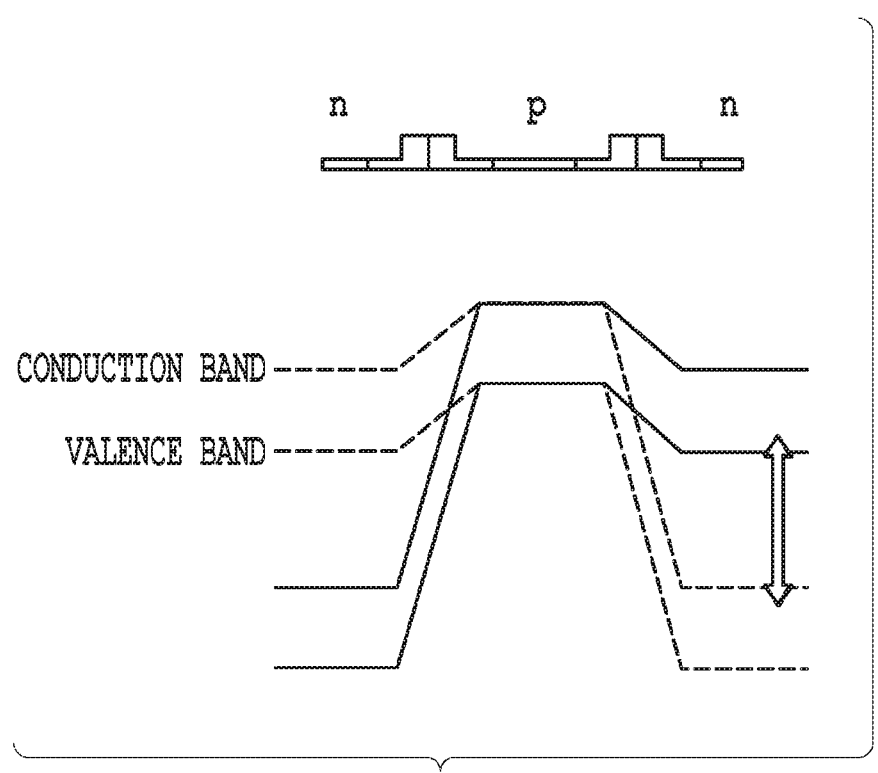
FIG. 15B shows the semiconductor doping status in the XVB-XVB cross section of FIG. 14 and a band diagram during the light modulation.
Figure 15C:
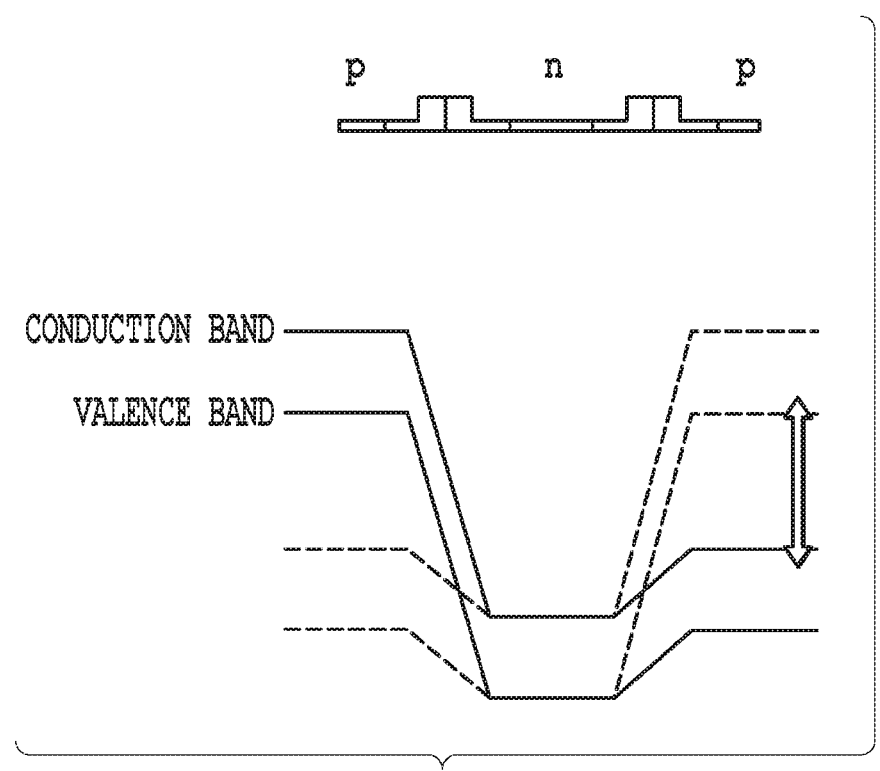
FIG. 15C shows the semiconductor doping status in the XVC-XVC cross section of FIG. 14 and a band diagram during the light modulation.

FIG. 15A, FIG. 15B, and FIG. 15C illustrate the doping status of the semiconductor and the band diagram during the light modulation at the cross sections XVA-XVA, XVB-XVB, and XVC-XVC in FIG. 14, respectively.

FIG. 15A shows the cross section XVA-XVA of the first region in FIG. 14 in which the two RF electrodes are both abutted to the p-type semiconductor layer and are applied with a differential signal. The DC electrode is abutted to the n-type semiconductor layer. By applying a positive voltage to the DC electrode compared to the voltage applied to the RF electrodes, a reverse bias is applied to the pn junction unit.

FIG. 15B shows the cross section XVB-XVB of the second region in FIG. 14 in which the two RF electrodes are both abutted to the n-type semiconductor layer and are applied with a differential signal. The DC electrode is abutted to the p-type semiconductor layer. By applying a negative voltage to the DC electrode compared to the voltage applied to the RF electrodes, a reverse bias is applied to the pn junction unit.

FIG. 15C illustrates the cross section XVC-XVC of the first region at the output side in FIG. 14 that is similar to the cross section XVA-XVA of FIG. 15A in that the two RF electrodes are both abutted to the p-type semiconductor layer and are applied with a differential signal. The DC electrode is abutted to the n-type semiconductor layer. By applying a positive voltage to the DC electrode compared to the voltage applied to the RF electrode, a reverse bias is applied to the pn junction unit.

Each of the two RF electrodes has a continuous structure in which the RF electrode is electrically connected between the first region and the second region, respectively. Since the RF electrodes have a multi-level crossing between the first region and the second region without being abutted to each other, in the cross section XVA-XVA and the cross section XVB-XVB, directions of applied voltages are reversed right and left. In the cross sections XVB-XVB and XVC-XVC, directions of applied voltages are similarly reversed right and left. The pn junction unit provided in the optical waveguide shown in FIG. 14 is configured so that the second region receives a high voltage when the first region receives a high voltage while the second region receives a low voltage when the first region receives a low voltage.

In the case of the Mach-Zehnder optical modulator, the carrier density in the two optical waveguides is changed to vary the refractive indexes of the respective waveguides to thereby phase-modulate light to cause light interference. This requires the phase change in the same direction in all regions of an optical waveguide.

If there is no intersection of the RF electrodes, the first region and the second region have reverse magnitudes of the potential difference applied to the pn junction unit. Thus, in all regions of the optical waveguide of the optical modulator, the phase change difference is undesirably cancelled. Thus, such a structure is required that allows the RF electrodes to intersect each other to provide the same potential difference applied to the pn junction unit in all regions of the optical waveguide.

Effect of Example 2 in Preventing the Characteristic Deterioration Caused by the Offset of the Implantation Mask The following section will describe the effect of preventing the characteristic deterioration caused by the offset of the implantation mask during the implantation process of the device manufacturing in the present invention.

According to the structure of Example 2, the offset of the pn junction position (offset amount) due to the mask offset during the implantation process can be similarly cancelled by the positive and negative amount in the first and second region. Specifically, when the first region undesirably has an implantation mask offset so as to increase the p-type layer, then the two second regions is formed by the same mask offset so as to reduce the p-type layer. Thus, the two waveguides constituting the Mach-Zehnder modulator have a reduced modulation efficiency difference, thus realizing an optical modulator having a good signal quality.

In Example 2, the first and second regions are set to have lengths in the light propagation direction at a ratio of about 1:2:1. In order to cancel the change of the modulation characteristic due to the pn junction position offset in the first regions and the second region, the first regions and the second region must have the modulation characteristic changes in reverse directions of an equal absolute value. Since the radio frequency signal is attenuated while propagating in the RF electrode, the length ratio of 1:2:1 also can cancel the reduction of the modulation efficiency due to the attenuation. This can easily provide, without requiring the measurement of the attenuation amount of RF electrode or a difference in the contact resistance between the electrode and the semiconductor layer for example between the first region and the second region, the cancellation of the change of the modulation characteristic due to the offset of the pn junction position by the first region and the second region.

In the description of Example 2, the first region has the RF electrode abutted to the p-type semiconductor layer and has the DC electrode abutted to the n-type semiconductor layer. However, the same effect also can be obtained by allowing the first region to include the RF electrode abutted to the n-type semiconductor layer and the DC electrode abutted to the p-type semiconductor layer.

The same effect also can be obtained by dividing not only the first region but also the second region and the first and second regions are alternately provided in the light propagation direction at a plurality of positions.

Example 3

Figure 16:
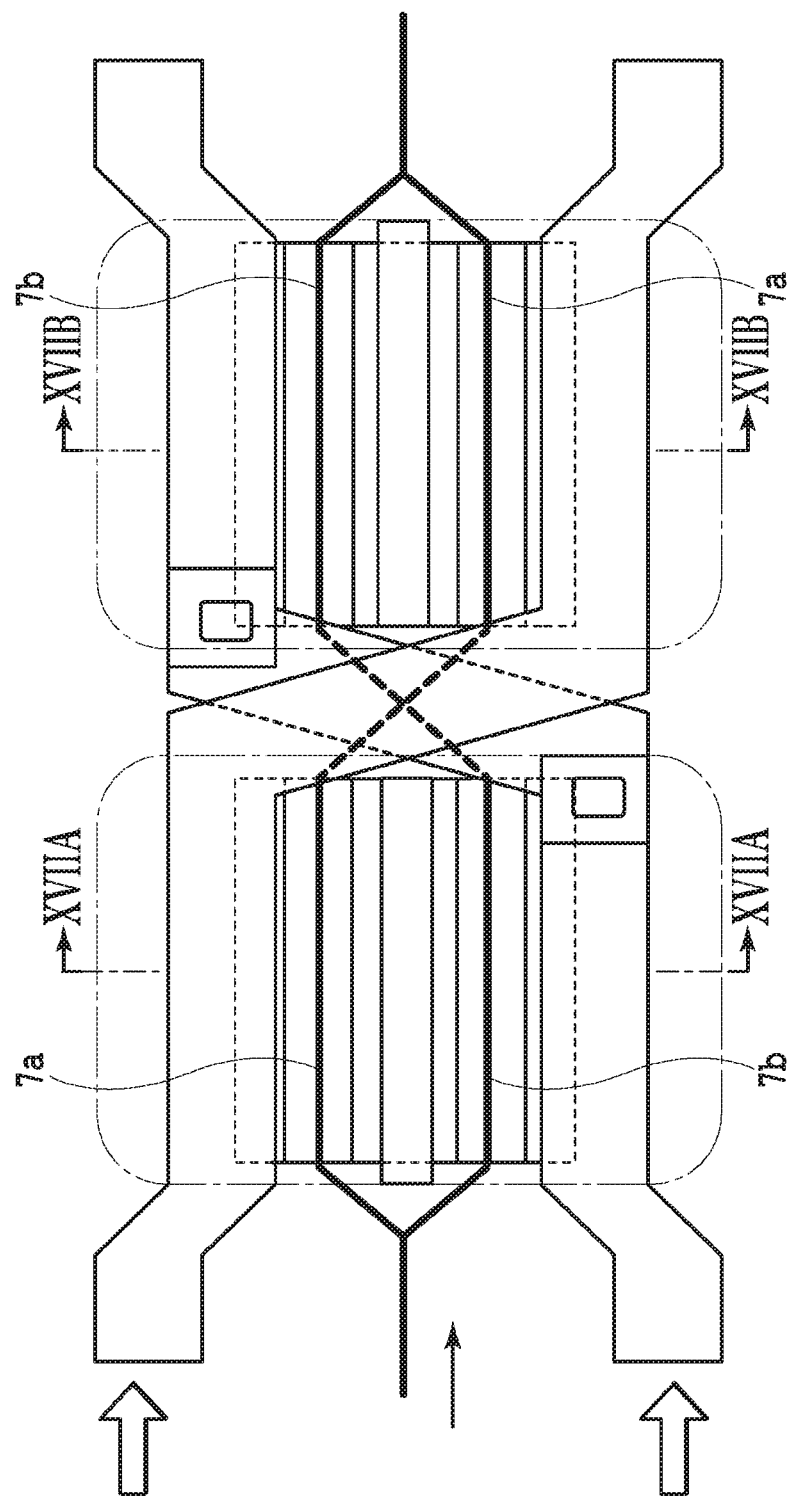
FIG. 16 is a plan view illustrating the configuration of a Mach-Zehnder optical modulator having a single electrode structure according to the third embodiment of the present invention.

FIG. 16 is a plan view illustrating the configuration of a Mach-Zehnder optical modulator having a single electrode structure according to the third embodiment of the present invention. Example 3 is characterized in that the RF electrodes have an intersection structure as in Example 1 and the two regions have the same semiconductor doping structure and instead have optical waveguides having an intersection structure.

As shown in FIG. 16, the optical modulator according to Example 3 of the present invention is configured so that the modulation unit is divided to a first region positioned at the input side of a light propagation direction of the optical waveguide (a part of the cross section XVIIA-XVIIA surrounded by the long dashed short dashed line) and a second region positioned at the output side (a part of the cross section XVIIB-XVIIB surrounded by the long dashed short dashed line). The two regions have the same semiconductor doping status (the semiconductor conductivity such as p-type/n-type). The two RF electrodes for applying one pair of differential signal voltages are multi-level crossing-connected between the first region and the second region. The two RF electrodes have therebetween a DC electrode for applying a bias voltage. The first region has the two RF electrodes both abutted to the p-type semiconductor layer and has the DC electrode abutted to the n-type semiconductor layer doped to have the n-type polarity different from that of the RF electrode.

The second region also has the two RF electrodes both abutted to the p-type semiconductor layer and has the DC electrode abutted to the n-type semiconductor layer doped to have the n-type polarity different from that of the RF electrode.

The two pn junction units functioning as a boundary between the p-type semiconductor layer and the n-type semiconductor layer include an Si optical waveguide in which light propagates, thus providing an Si optical modulator having a single electrode structure.

Each of the two RF electrodes has a continuous structure in which the RF electrode is electrically connected between the first region and the second region, respectively. The DC electrode has the first region and the second region that are electrically connected to have a continuous relation or that are electrically separated and independent from each other. The two RF electrodes are configured to have a multi-level crossing to each other without being abutted each other between the first region and the second region. The two Si optical waveguides are configured to intersect each other between the first region and the second region. The first and second regions are set to have lengths having a ratio to the entire length thereof in the light propagation direction of about ½ for example.

Figure 17A:
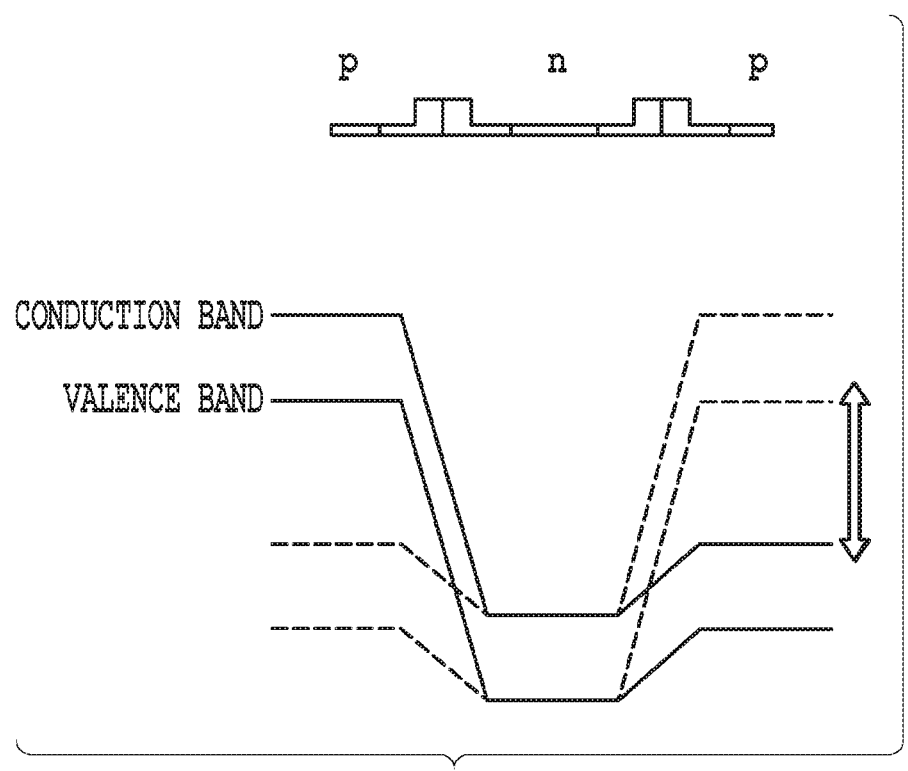
FIG. 17A shows the semiconductor doping status in the XVIIA-XVIIA cross section of FIG. 16 and a band diagram during the light modulation.
Figure 17B:
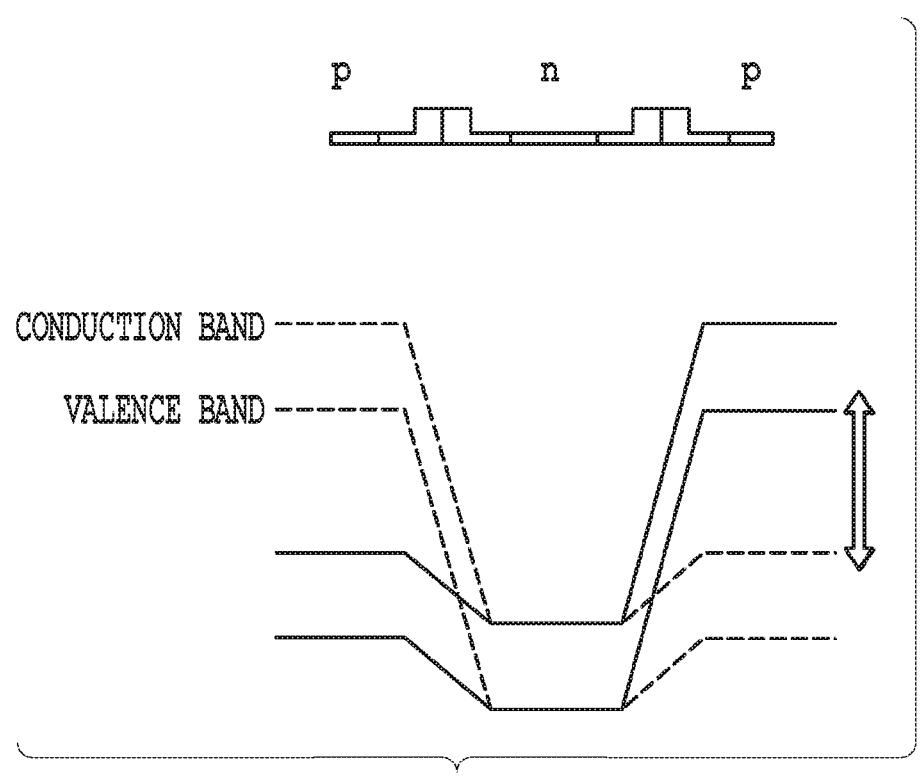
FIG. 17B shows the semiconductor doping status in the XVIIB-XVIIB cross section of FIG. 16 and a band diagram during the light modulation.

FIG. 17A and FIG. 17B illustrate the doping status of the semiconductor and the band diagram during the light modulation at the cross sections XVIIA-XVIIA and XVIIB-XVIIB of FIG. 16, respectively.

FIG. 17A shows the cross section XVIIA-XVIIA of the first region FIG. 16 in which the two RF electrodes are both abutted to the p-type semiconductor layer and are applied with a differential signal. The DC electrode is abutted to the n-type semiconductor layer. By applying a positive voltage to the DC electrode compared to the voltage applied to the RF electrodes, a reverse bias is applied to the pn junction unit.

FIG. 17B shows the cross section XVIIB-XVIIB of the second region FIG. 16 in which the two RF electrodes are similarly both abutted to the p-type semiconductor layer and are applied with a differential signal. The DC electrode is abutted to the n-type semiconductor layer. By applying a positive voltage to the DC electrode compared to the voltage applied to the RF electrodes, a reverse bias is applied to the pn junction unit.

Each of the two RF electrodes has a continuous structure in which the RF electrode is electrically connected between the first region and the second region, respectively. Since the RF electrodes have a multi-level crossing to each other between the first region and the second region without being abutted to each other, RF voltages are applied with reverse left and right direction in the cross sections XVIIA-XVIIA and XVIIB-XVIIB, respectively.

However, since the Si optical waveguides also intersect each other between the first region and the second region, no change is caused in the RF voltage applied to the light propagating in the Si optical waveguides in the cross sections XVIIA-XVIIA and XVIIB-XVIIB. Thus, the pn junction unit provided in the optical waveguide is configured so that the second region receives a high voltage when the first region receives a high voltage while the second region receives a low voltage when the first region receives a low voltage.

In the Mach-Zehnder optical modulator, the carrier densities in the two optical waveguides are changed to change the refractive indexes of the respective waveguides to thereby modulate the phase of lights to cause light interference. This requires the phase of light in one optical waveguide changes to the same direction in all regions of the optical waveguide.

In the case of the optical modulator of Example 1, the DC electrode require positive and negative two voltages relative to the RF electrodes to be applied in the first region and the second region. However, in the case of the optical modulator of Example 3, the Si optical waveguides are allowed to intersect each other to thereby provide the same doping structure in the two regions, thus providing a single voltage applied to the DC electrode.

Alternatively, by allowing the DC electrode to have an independent structure electrically separated by the first region and the second region, the bias voltages applied to the first region the second region can be minutely controlled while having the same polarity.

Effect of Example 3 in Preventing the Characteristic Deterioration Caused by the Offset of the Implantation Mask The following section will describe the effect of preventing the characteristic deterioration caused by the offset of the implantation mask during the implantation process of the device manufacturing.

According to the structure of Example 3, the offset of the pn junction position (offset amount) due to the mask offset during the implantation process can be similarly cancelled, as in Examples 1 and 2, by the first region and the second region in the positive and negative directions. Specifically, the two regions have the same doping structure and the two RF electrodes intersect each other and the two optical waveguides intersect each other. Thus, when one optical waveguide (e.g., the upper side of FIG. 16) in the first region undesirably has an implantation mask that is offset so as to increase the p-type layer, then the light having propagated in the optical waveguide is allowed to propagate, in the second region formed by the same mask, in the other optical waveguide (e.g., the lower side of FIG. 16) that is offset so as to reduce the p-type layer by the intersection of the optical waveguides. Thus, the two waveguides constituting the Mach-Zehnder modulator have a reduced modulation efficiency difference, thus realizing an optical modulator having a good signal quality.

In this example 3, the first and second regions are set to have lengths in the light propagation direction at a ratio of about ½ relative to the entire lengths thereof. In order to cancel the change of the modulation characteristic due to the offset of the pn junction position by the first regions and the second region, the first regions and the second region must have the modulation characteristic changes in reverse directions that have an equal absolute value. This requires the first region and the second region to have a substantially-equal length, thus allowing the respective regions having length at a ratio of about ½ to the entire lengths thereof.

On the other hand, the radio frequency signal is attenuated while propagating in the RF electrode. Thus, when the reduction of the modulation efficiency due to the attenuation cannot be ignored, the first region located at the input side of the RF signal must have a length shorter than that of the second region located at the output side, in the light propagation direction. This can consequently cancel the change of the modulation characteristic due to the offset of the pn junction position by the first region and the second region. An appropriate ratio between the lengths depends on the attenuation amount of the RF electrode or a difference in the contact resistance between the electrode and the semiconductor layer of the first region and the second region. The ratio is generally about 1:3 to about 1:1. A cancelling effect in the change of the modulation characteristic caused by the pn junction position offset also can be confirmed by the length ratio within a range from 1:5 to 5:1.

In the description of this example 3, the first region includes the RF electrode abutted to the p-type semiconductor layer and includes the DC electrode abutted to the n-type semiconductor layer. However, the same effect also can be obtained by allowing the first region to include the RF electrode abutted to the n-type semiconductor layer and the DC electrode abutted to the p-type semiconductor layer.

The RF electrode is preferably formed by a wiring using metal having a low resistivity in order to prevent the attenuation of the radio frequency signal. However, the DC electrode is not limited to metal and also may be formed by a wiring using the conductivity of the semiconductor layer. In this case, the DC electrode does not extend over the entire region of the first region or the second region and also may be abutted to a part thereof.

Example 4

Figure 18:
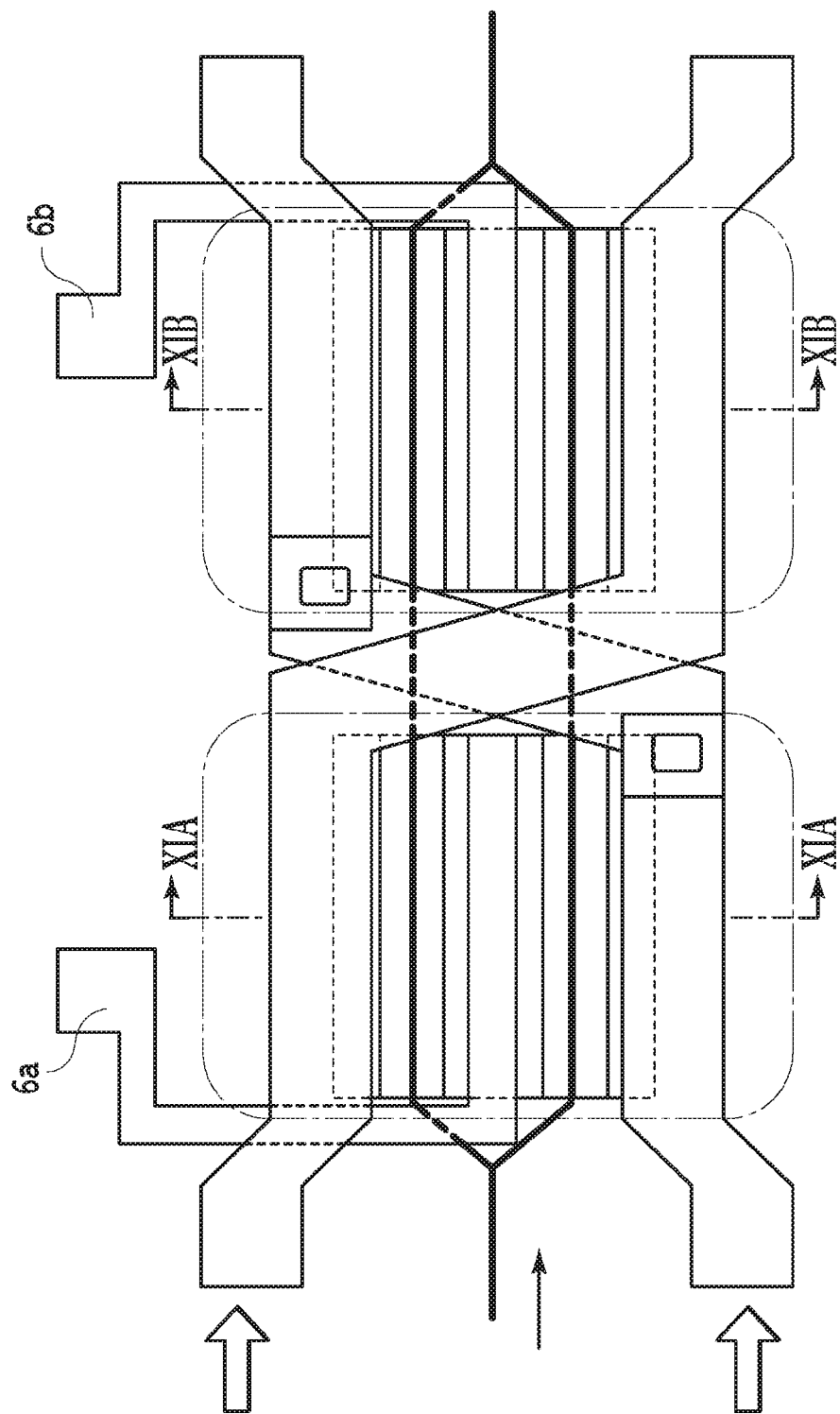
FIG. 18 is a plan view illustrating the configuration of a Mach-Zehnder optical modulator having a single electrode structure according to the fourth embodiment of the present invention.

FIG. 18 is a plan view illustrating a Mach-Zehnder optical modulator having a single electrode structure as the fourth embodiment of the present invention. Example 4 of FIG. 18 has the same basic structure as that of Example 1 of FIG. 10 except for that the first region and the second region have wirings for applying a voltage to the DC electrodes 6a and 6b have a multi-level crossing with the RF electrodes 5a and 5b.

The DC electrodes 6a and 6b of FIG. 18 are configured, at the wiring through which the DC electrodes 6a and 6b are drawn, so as to have a multi-level crossing to each other without being abutted to the RF electrodes 5a and 5b. Thus, the DC electrodes 6a and 6b are not electrically connected to each other. The DC electrodes and RF electrodes having a multi-level crossing can prevent the bypassing of an electric wiring, thus realizing a compact optical modulator.

The optical modulator having the structure shown in Example 2 (FIG. 14) in which the center DC electrode surrounded by the RF electrodes also can be combined with the above wiring. This wiring can consequently provide an easy power supply to the DC electrode, thus providing an optical modulator for which the wiring layout can be determined without limitation.

Description of the Effect of Example 1

Figure 8A:
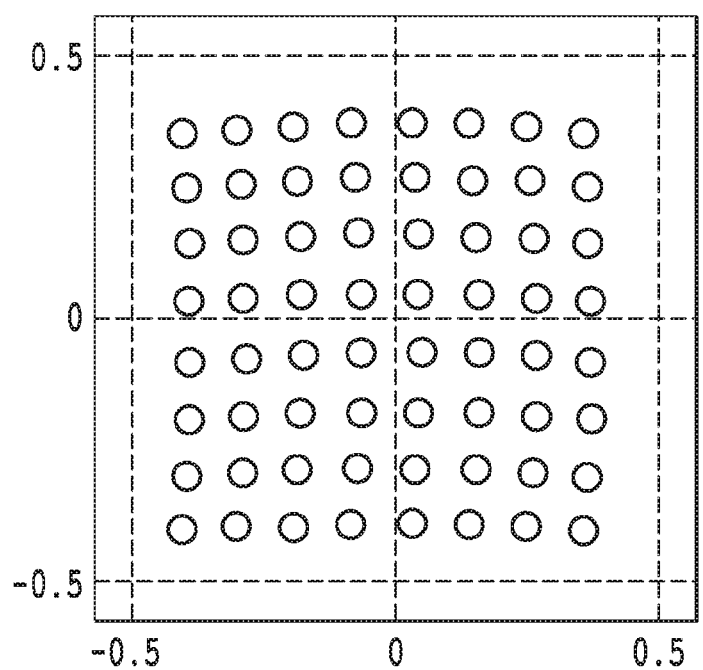
FIG. 8A illustrates a Constellation Map of the entirety of deteriorated 64QAM modulation signals.
Figure 8B:
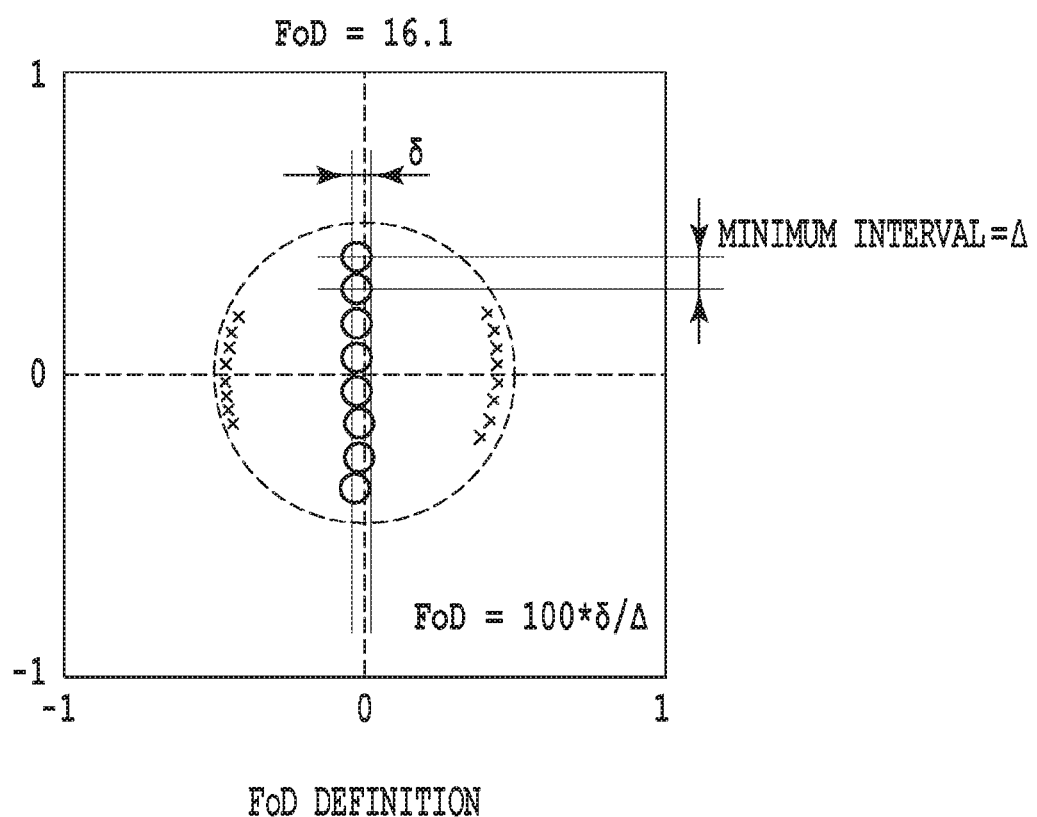
FIG. 8B is a diagram to explain the definition of a signal quality deterioration index FoD.
Figure 19:
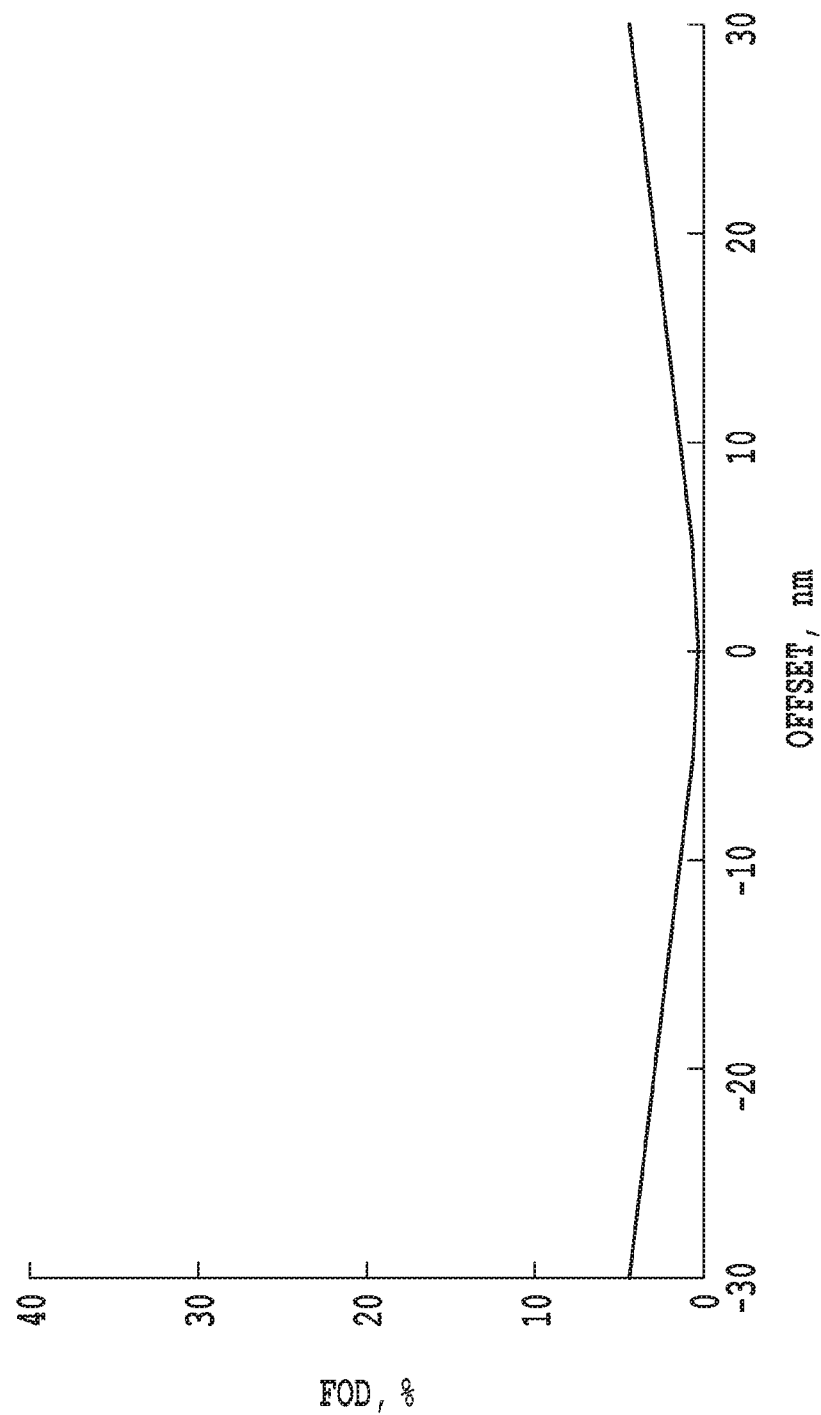
FIG. 19 illustrates how the deterioration (FoD) of the light signal quality of the optical modulator is improved according to the first embodiment of the present invention.

FIG. 19 illustrates, using FoD for the 64QAM modulation signals defined in FIG. 8B, how the deterioration of the light signal quality of the optical modulator having the single electrode structure of Example 1 (FIG. 10) of the present invention is improved when the position of the pn junction is offset.

Figure 9:
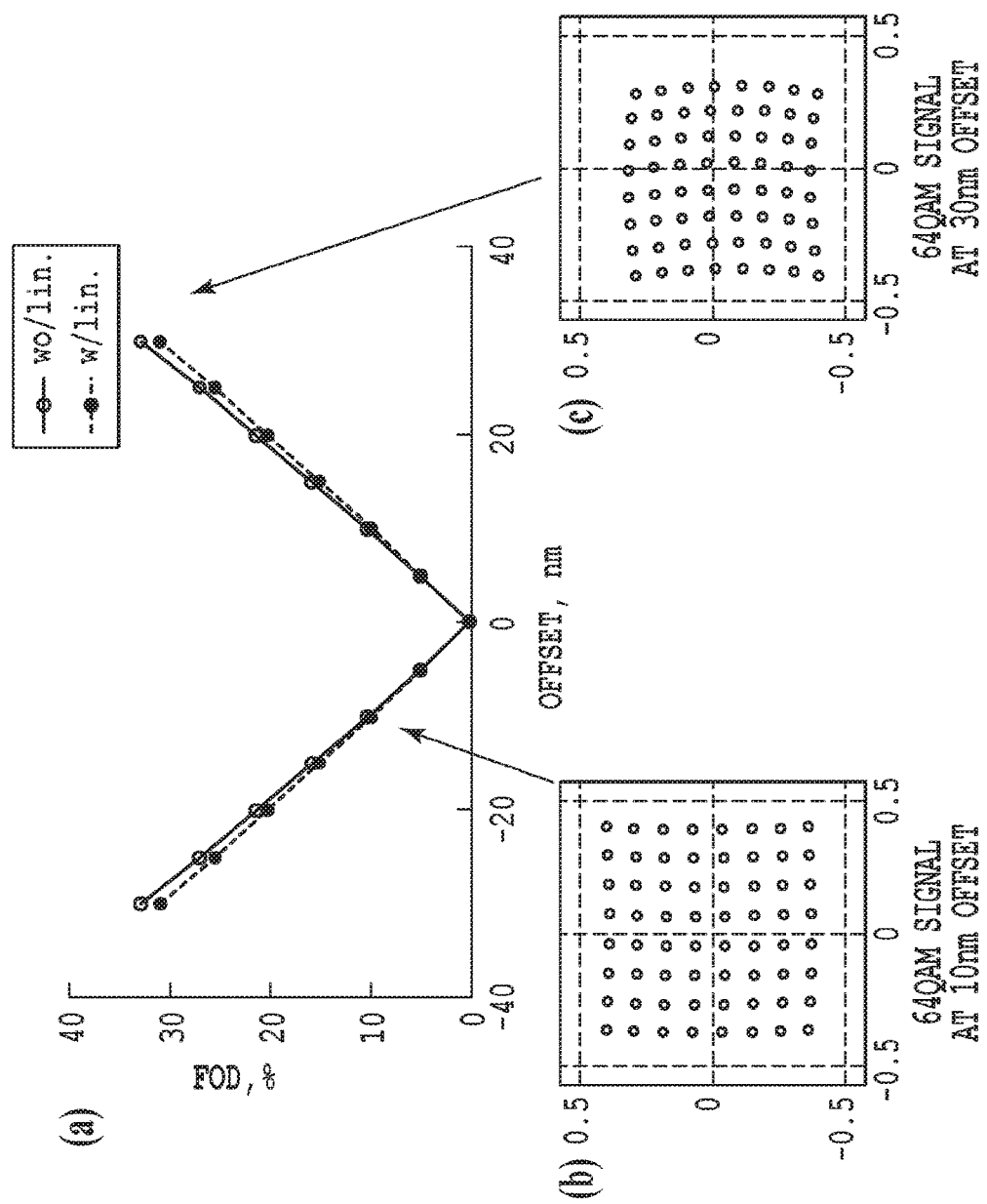
FIG. 9($a$) illustrates a graph of the FoD values when the pn junction is offset.

In this example 1, an optical modulator having a good signal quality can be realized because the change of the modulation characteristic caused by the position offset of the pn junction in the single electrode structure is cancelled by the first region and the second region. As shown in FIG. 19, even when the mask offset of 30 nm (offset amount) occurs during the implantation, the FoD is 5 percent or less. A significant improvement is obtained compared with the conventional technique (shown in FIG. 9(a)) in which 30 percent or more of the symbol interval is consumed by the S-like distortion on the constellation.

Figure 20:
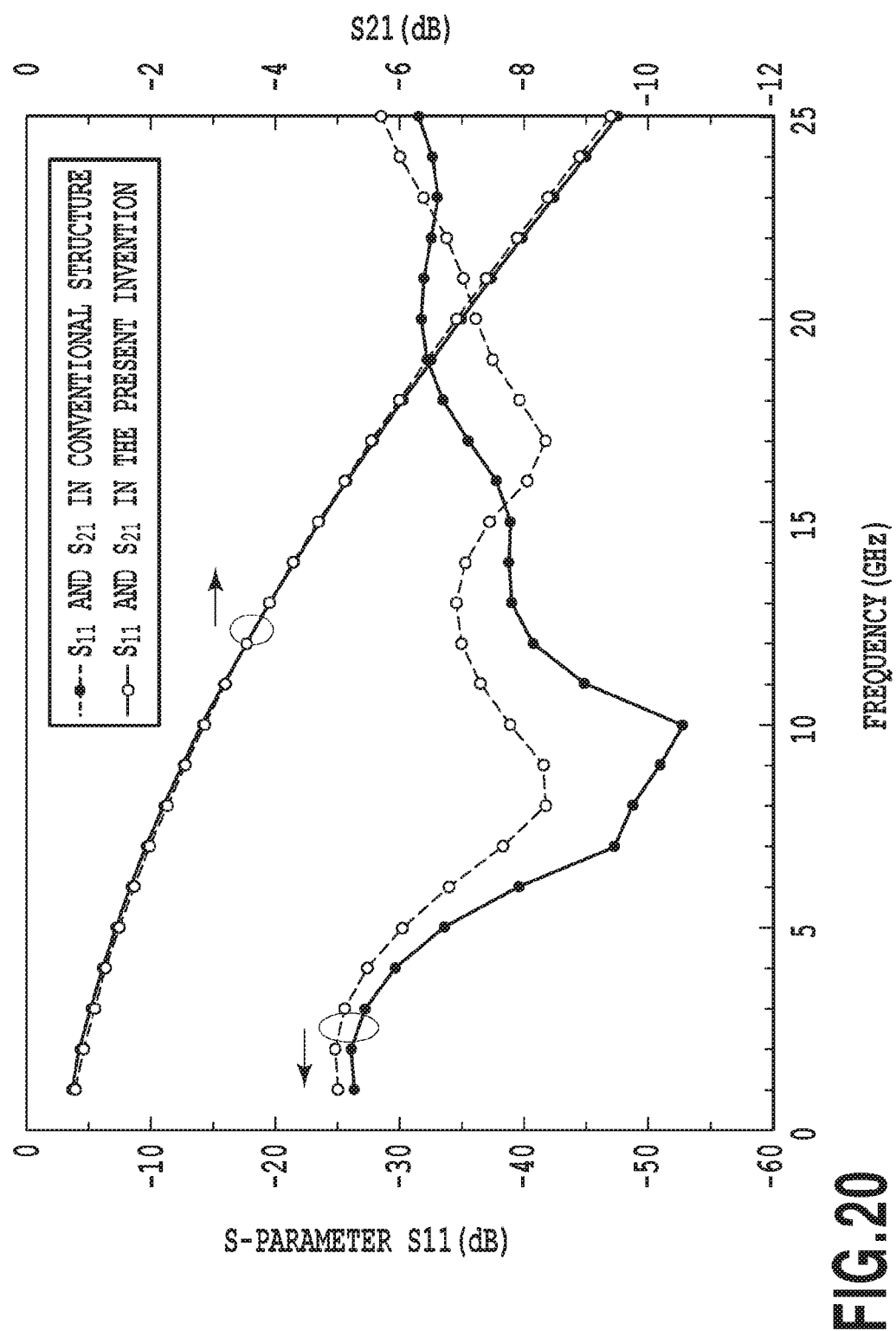
FIG. 20 illustrates the transmission characteristic and the reflection characteristic of the RF signal by S parameters of the optical modulator according to the first embodiment of the present invention.

FIG. 20 illustrates the transmission and reflection frequency characteristic in the S parameters of the RF signal with regard to the optical modulator of the Example 1 of the present invention. In the case of the optical modulator according to this example 1, the RF electrodes have a multi-level crossing or intersection without being abutted to each other between the first region and the second region. Such a structure has a risk where an increase of the reflection of the RF signal causes the reduction of transmitted signals, thus deteriorating the modulation efficiency. However, by designing the intersection having an appropriate shape, a favorable characteristic can be maintained in which the increase of the reflection is 1.5 dB or less and substantially no reduction is seen in the transmission signals.

The intersection structure of the RF electrodes can be introduced by using a general step in preparing an Si optical modulator, and is realized by subjecting metal between $SiO_2$ layers such as a multi-layer wiring technique. Instead of this manufacturing process, the manufacturing of the Si optical modulator also may be followed by the wiring process such as the wire bonding.

Embodiment of a Mach-Zehnder Modulator Having a Dual Electrode Structure

Examples 1 to 4 of the Mach-Zehnder modulator of the single electrode structure described above have, as has been described in relation to the conventional technique, an advantage of providing an external circuit such as a bias tee can be simplified. However, as is clear from FIG. 3 and the plan views of the respective embodiments 1 to 4, two RF electrodes corresponding to two arms of the Mach-Zehnder modulator are originally configured on the same layer, and must have a multi-level crossing to each other in order to cancel the mask offset. In the embodiment 3 (FIG. 16), the two optical waveguides also require a multi-level crossing.

The manufacturing of such a multi-level crossing structure requires one of the two RF electrodes or one of the two optical waveguides originally provided on one layer to be connected once to another upper or lower layer in order to provide the multi-level crossing, which tends to cause a complicated manufacture step of the optical modulator.

In the embodiment of the Mach-Zehnder modulator having the dual electrode structure described below, ground electrodes existing at the outer side and the center of the RF electrode can be used to thereby eliminate the need for such a multi-level crossing structure.

Example 5

Figure 21:
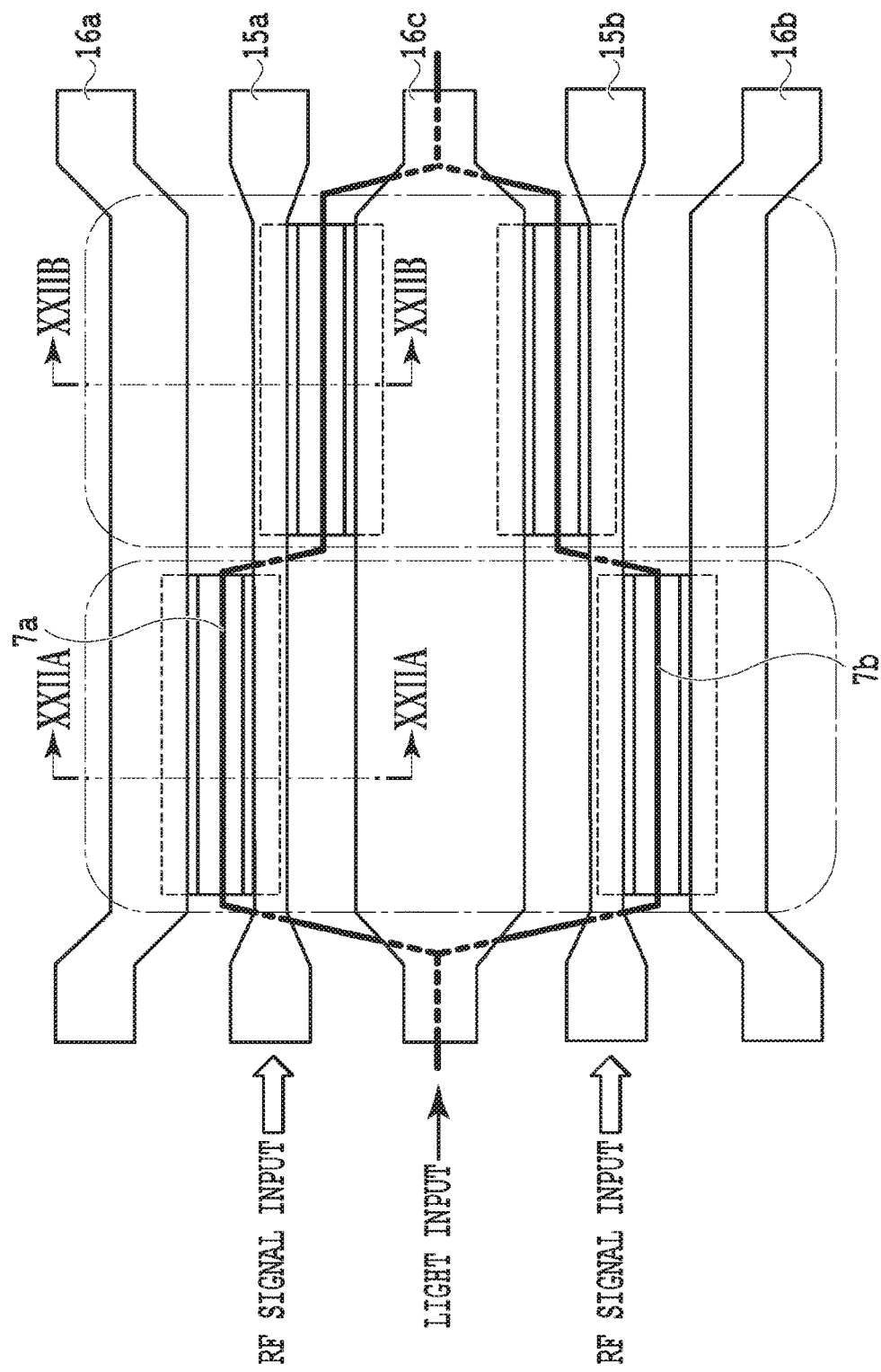
FIG. 21 is a plan view illustrating the configuration of the Mach-Zehnder optical modulator having the dual electrode structure according to the fifth embodiment of the present invention.

FIG. 21 is a plan view illustrating the configuration of the Mach-Zehnder optical modulator having the dual electrode structure according to the fifth embodiment of the present invention.

As shown in FIG. 21, the optical modulator according to Example 5 of the present invention has a modulation unit having a dual electrode structure. This modulation unit is divided to a first region positioned at the input side of a light propagation direction of the optical waveguide (a part of the cross section XXIIA-XXIIA surrounded by the long dashed short dashed line, see also a partial cross-sectional view of FIG. 22A) and a second region positioned at the output side (a part of the cross section XXIIB-XXIIB surrounded by the long dashed short dashed line, see also a partial cross-sectional view of FIG. 22B).

In the case of the Mach-Zehnder optical modulator according to the fifth embodiment of the present invention, the upper arm of the Mach-Zehnder optical modulator corresponding to the optical waveguide 7a of FIG. 21 is configured to have a first region and a second region. The first region at the left side (including the cross section XXIIA-XXIIA in FIG. 22A) has the optical waveguide 7a and the corresponding semiconductor area that are provided between the RF electrode 15a and the outer ground electrode 16a. The second region at the right side (including the cross section XXIIB-XXIIB in FIG. 22B) has the optical waveguide 7a and the corresponding semiconductor area that are provided between RF electrode 15a and the center ground electrode 16c.

As shown in FIG. 21, the RF electrode 15a has a straight structure. However, the optical waveguide 7a extending therewith is configured, in the connection area between the first region and the second region, so as to extend in the light propagation direction to turn right to extend under the RF electrode 15a to form an intersection to subsequently turn left, thereby forming a so-called crank shape. Similarly, the RF electrode 15b has a straight structure. The optical waveguide 7b extending therewith is configured, in the connection area between the first region and the second region, so as to extend in the light propagation direction to turn left to extend under the RF electrode 15b to form an intersection to subsequently turn right, thereby forming a crank shape.

By the arrangement forming the shape as described above, the connection area between the first region and the second region has the RF electrodes and the optical waveguides intersecting each other. However, the RF electrodes and the optical waveguides are formed in different layers and thus cause no difficulty in the manufacturing process.

In FIG. 21 of Example 5, in the first region and the second region, the positional relationships between the RF electrode and the optical waveguide and the doping status of the semiconductor area (the polarity or conductivity of the semiconductor such as p-type/n-type) are both in symmetry of rotation of 180 degrees around the intersection point of the RF electrodes and the optical waveguides. At the same time, the first region and the second region including the two RF electrodes and the optical waveguides are entirely structured so as to form the symmetry of reflection at the upper and lower sides of FIG. 21 with regard to the center ground electrode 16c.

Each of the two optical waveguides 7a and 7b constituting the arm of the Mach-Zehnder optical modulator is continuous in the middle area between the first region and the second region, continuously extending to form a crank shape from one side of the straight RF electrode to the other side. At the one side of the arms, the RF electrode and the optical waveguide are multi-level crossing to each other. But, between the both side of the arms, the optical waveguides are not multi-level crossing to each other, and the RF electrodes also are not.

Figure 22A:
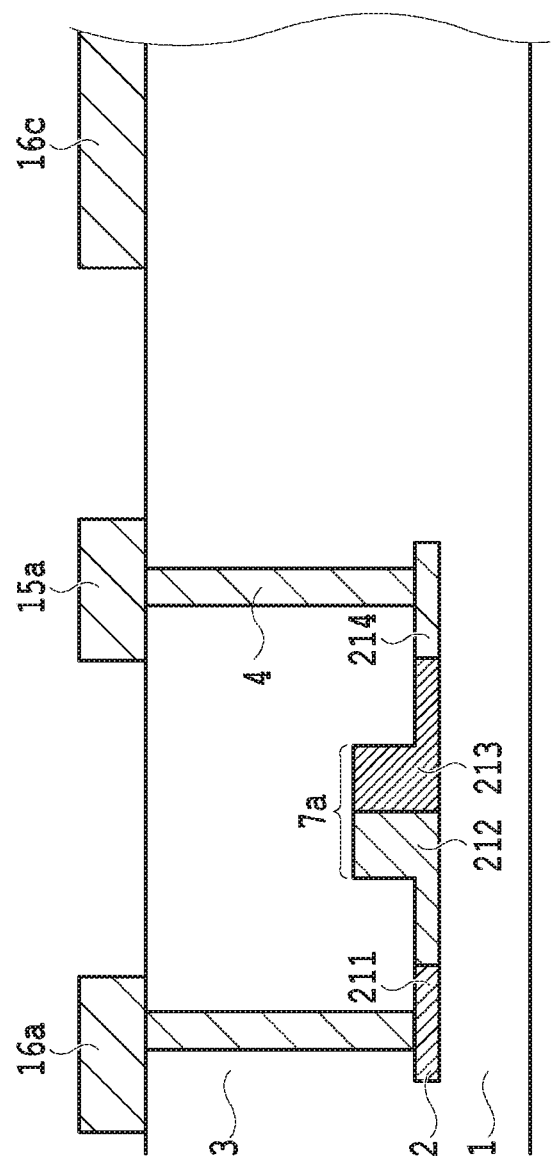
FIG. 22A is a partial cross-sectional view of XXIIA-XXIIA in FIG. 21.
Figure 22B:
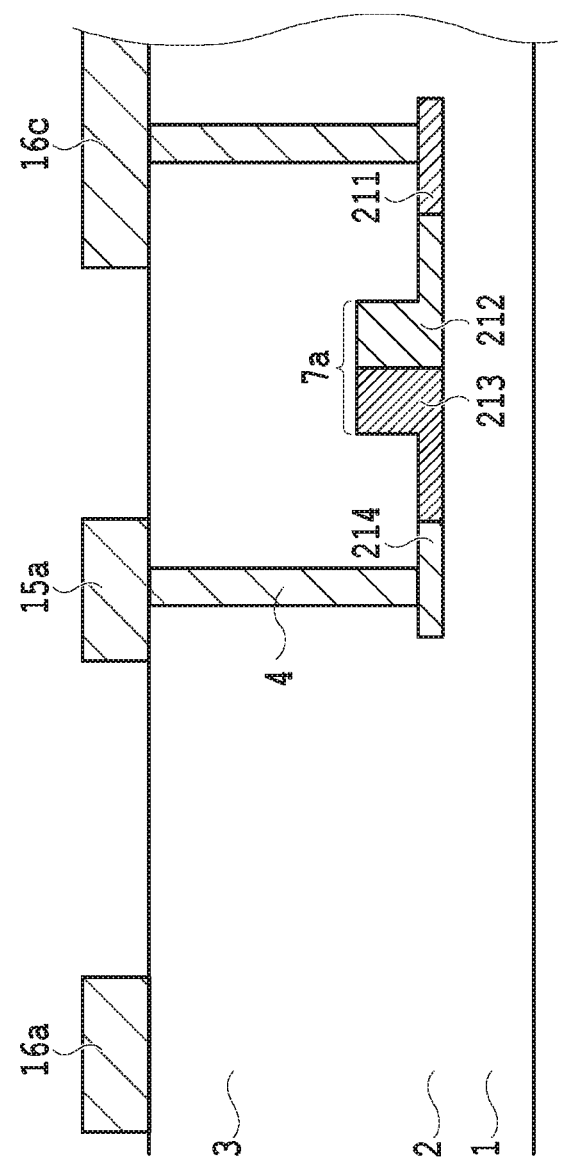
FIG. 22B is a partial cross-sectional view of XXIIB-XXIIB in FIG. 21.

As shown in the partial cross-sectional views of FIG. 22A and FIG. 22B, the electrical connection between the RF electrode and the semiconductor layer is provided by one or plurality of via(s) 4 (penetration electrode(s)). However, in the connection area between the first region and the second region in FIG. 21 (where an intersection with the optical waveguide exists), the via 4 (penetration electrode) providing the connection from the RF electrode 15a to the semiconductor layer 214 is not provided. Thus, the optical waveguide 7a(7b) is allowed to extend under the RF electrode 15a in the intersection area. In FIG. 21, the optical waveguide 7a(7b) extend from the upper-left side to the lower-right side (or from the lower-left side to the upper-right side). In the second region, as shown in FIG. 22B, the RF electrode 15a and the semiconductor layer 214 are electrically connected by way of the via 4, again. Such a structure prevents the via made of metal positioned close to the optical waveguide from absorbing light, thus prevents from causing a loss of light.

The first and second regions are set to have lengths in the light propagation direction that are about ½ of the entire lengths thereof.

Including Examples 6 and 7 shown below, the dual electrode structure has the center ground electrode 16c that is represented as one electrode. However, in order to avoid the interference or crosstalk of the RF signal between the upper and lower arms, the ground electrode 16c also can be configured as separated two electrodes structures (see Example 8 described below and the reference numerals 16c1 and 16c2 of FIG. 27) that are composed of two electrode parts interposing the center line.

Figure 28:
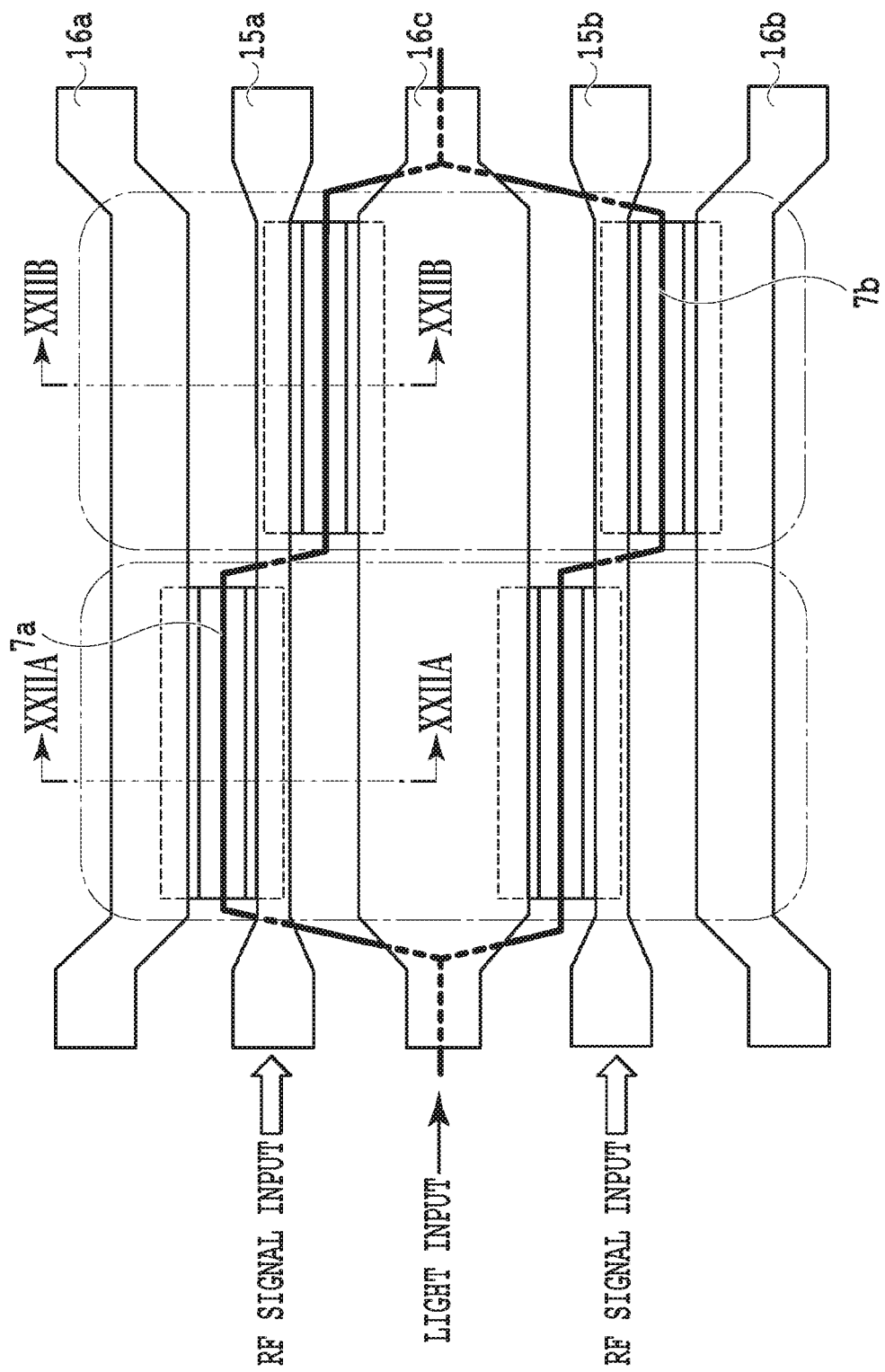
FIG. 28 is a plan view illustrating the configuration of the optical modulator having the dual electrode structure as a modification example of the fifth embodiment of the present invention.

In the above example of FIG. 21, an example was shown in which the first region and the second region were arranged at the upper side and the lower side of FIG. 21 to form the symmetry of reflection with regard to the center ground electrode 16c. However, in the first region and the second region, the positional relationships between the optical waveguide and one RF electrode and the doping status of the semiconductor area (the polarity or conductivity of the semiconductor such as p-type/n-type) are needed to be in symmetry of rotation of 180 degrees around the intersection point of the RF electrodes and the optical waveguides. Thus, the first region and the second region including the two RF electrodes and the optical waveguides are not always required to be entirely structured so as to form the symmetry of reflection at the upper and lower sides with regard to the center ground electrode 16c. Therefore, a modification example of the fifth embodiment also may be obtained as a layout as shown in FIG. 28 in which the doping statuses of the semiconductor are similarly arranged in the semiconductor areas in the upper and lower two arms of the respective regions so that the entire structure allows one arm to be moved in parallel to the other.

Effect of Example 5 in Preventing the Characteristic Deterioration Caused by the Offset of the Implantation Mask The following section will describe the effect of preventing the characteristic deterioration caused by the mask offset during the implantation process of a device manufacturing in the present invention.

In the structure of Example 5, the offset of the pn junction position (offset amount) due to the mask offset during the implantation can be cancelled by the first region and the second region in the positive and negative directions. Specifically, when the first region undesirably has an implantation mask that is offset so as to increase the p-type layer, then the second region has the same mask that is offset so as to reduce the p-type layer. Thus, the two waveguides constituting the Mach-Zehnder modulator have a reduced modulation efficiency difference, thus realizing an optical modulator having a good signal quality.

In Example 5, the first and second regions are set to have lengths in the light propagation direction that are about ½ of the entire lengths thereof. In order to cancel the change of the modulation characteristic due to the offset of the pn junction position by the first region and the second region, the first region and the second region must have the modulation characteristic changes in reverse directions that have an equal absolute value. This requires the first region and the second region to have a substantially-equal length. Thus, the respective regions are set to have lengths that are about ½ of the entire lengths thereof.

On the other hand, the radio frequency signal is attenuated while propagating in the RF electrode. Thus, when the reduction of the modulation efficiency due to the attenuation cannot be ignored, the first region located at the input side of the RF signal must have a length shorter than that of the second region located at the output side, in the light propagation direction. This can consequently cancel the change of the modulation characteristic due to the offset of the pn junction position by the first region and the second region. An appropriate ratio between the lengths depends on the attenuation amount of the RF electrode or a difference in the contact resistance between the electrode and the semiconductor layer of the first region and the second region. The ratio is generally about 1:3 to about 1:1. A cancelling effect in the change of the modulation characteristic caused by the pn junction position offset also can be confirmed by the length ratio within a range from 1:5 to 5:1.

In the description of Example 5, the first region includes the RF electrode abutted to the n-type semiconductor layer and includes the ground electrode abutted to the p-type semiconductor layer. However, the same effect also can be obtained by allowing the first region to include the RF electrode abutted to the p-type semiconductor layer and the ground electrode abutted to the n-type semiconductor layer.

Example 6

Figure 23:
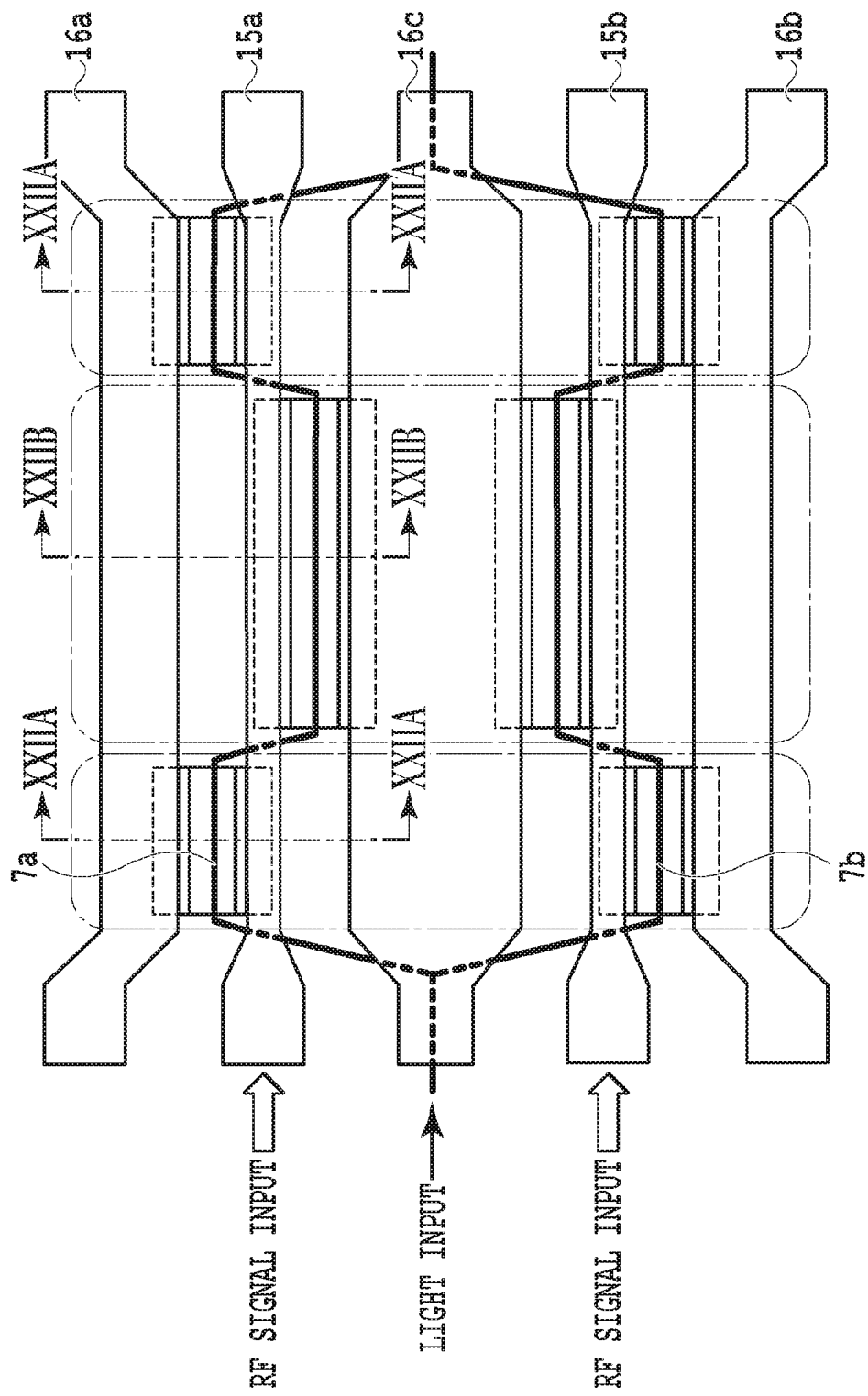
FIG. 23 is a plan view illustrating the configuration of the Mach-Zehnder optical modulator having the dual electrode structure according to the sixth embodiment of the present invention.

FIG. 23 is a plan view illustrating the configuration of the Mach-Zehnder optical modulator having the dual electrode structure according to the sixth embodiment of the present invention.

As shown in FIG. 23, the optical modulator according to Example 6 of the present invention has a modulation unit having a dual electrode structure divided to three regions. A first region is positioned at the input side of a light propagation direction of the optical waveguide (a part of the cross section XXIIA-XXIIA surrounded by the long dashed short dashed line as shown in the partial cross-sectional view of FIG. 22A). The other first region is positioned at the output side (a part of the cross section XXIIA-XXIIA surrounded by the long dashed short dashed line as shown in the partial cross-sectional view of FIG. 22A). And a second region is interposed between the two first regions (a part of the cross section XXIIB-XXIIB surrounded by the long dashed short dashed line as shown in the partial cross-sectional view of FIG. 22B).

In the case of the Mach-Zehnder optical modulator according to the sixth embodiment of the present invention, the upper arm of the Mach-Zehnder optical modulator corresponding to the optical waveguide 7a of FIG. 23 is configured to have three regions. The first region at the left side has the optical waveguide 7a and the corresponding semiconductor area that are provided between the RF electrode 15a and the outer ground electrode 16a. The second region at the center has the optical waveguide 7a and the corresponding semiconductor area that are provided between the RF electrode 15a and the center ground electrode 16c. The first region at the right side has the optical waveguide 7a and the corresponding semiconductor area that are again provided between the RF electrode 15a and the outer ground electrode 16a.

The RF electrode 15a has a straight structure. However, the optical waveguide 7a has a so-called double crank shape. By the arrangement as described above, the two connection areas located between the two first region at the left and right sides and one second region at the center have the RF electrodes and the optical waveguides intersecting each other. However, the RF electrodes and the optical waveguides are formed in different layers and thus cause no difficulty in the manufacturing process.

In FIG. 23 of Example 6, in the first region and the second region, the positional relationships between the optical waveguide to one RF electrode and the doping status of the semiconductor areas (the polarity or conductivity of the semiconductor such as p-type/n-type) are both in symmetry of rotation of 180 degrees around the two intersection points of the RF electrodes and the optical waveguides. At the same time, the first region and the second region including the two RF electrodes and the optical waveguides are entirely structured so as to form the symmetry of reflection at the upper and lower sides of FIG. 23 with regard to the center ground electrode 16c.

Each of the two optical waveguides 7a and 7b constituting the arm of the Mach-Zehnder optical modulator is continuous in the two middle areas between the two first region at the left and right sides and the one second region at the center, continuously extending to form double crank shape from one side of the straight RF electrode to the other side, and then back to the original side. At the one side of the arms, the RF electrode and the optical waveguide are multi-level crossing to each other. But, between the both side of the arms, the optical waveguides are not multi-level crossing to each other, and the RF electrodes also are not.

In the two connection areas among the two first regions at the left and right sides and the one second region at the center of FIG. 23, the via 4 (penetration electrode) providing the connection from the RF electrode 15a to the semiconductor layer 214 is not provided. Thus, the optical waveguide 7a(7b) is allowed to extend under the RF electrode 15a(15b) in the intersection areas. In FIG. 23, in the first (left) intersection area, the optical waveguide 7a(7b) extend from the upper-left side to the lower-right side (or from the lower-left side to the upper-right side), and conversely in the second (right) intersection area. In the second region, as shown in FIG. 22B, the RF electrode 15a and the semiconductor layer 214 are electrically connected by way of the via 4, again. Such a structure prevents the via made of metal positioned close to the optical waveguide from absorbing light, thus prevents from causing a loss of light.

The first and second regions are set to have lengths in the light propagation direction that are at a ratio of about 1:2:1.

Effect of Example 6 in Preventing the Characteristic Deterioration Caused by the Offset of the Implantation Mask The following section will describe the effect of preventing the characteristic deterioration caused by the mask offset during the implantation process of a device manufacturing in the present invention.

In the structure of Example 6, the offset of the pn junction position (offset amount) due to the mask offset during the implantation also can be cancelled by the two first regions provided at the left and right sides and the second region at the center in the positive and negative directions. Specifically, when the first region undesirably has an implantation mask that is offset so as to increase the p-type layer, then the second region has the same mask that is offset so as to reduce the p-type layer. Thus, the two waveguides constituting the Mach-Zehnder modulator have a reduced modulation efficiency difference, thus realizing an optical modulator having a good signal quality.

In Example 6, the two first regions at the left and right sides and the second region at the center are set to have lengths in the light propagation direction at a ratio of about 1:2:1. In order to cancel the change of the modulation characteristic due to the offset of the pn junction position by the first regions and the second region, the first regions and the second region must have the modulation characteristic changes in reverse directions that have an equal absolute value. The radio frequency signal is attenuated while propagating in the RF electrode. Thus, the length ratio of 1:2:1 also can cancel the reduction of the modulation efficiency due to the attenuation.

In this way, without measuring the attenuation amount of RF electrode or a difference in the contact resistance between the electrode and the semiconductor layer for example, the cancellation of the change of the modulation characteristic due to the offset of the pn junction position can be accomplished by providing the first regions and the second region.

In the description of Example 6, the first region has the RF electrode abutted to the p-type semiconductor layer and has the DC (ground) electrode abutted to the n-type semiconductor layer. However, the same effect also can be obtained by allowing the first region to include the RF electrode abutted to the n-type semiconductor layer and the DC (ground) electrode abutted to the p-type semiconductor layer.

The same effect also can be obtained by dividing not only the first region but also the second region, and the first and second regions can be alternately provided in the light propagation direction at a plurality of positions.

Example 7

Figure 24:
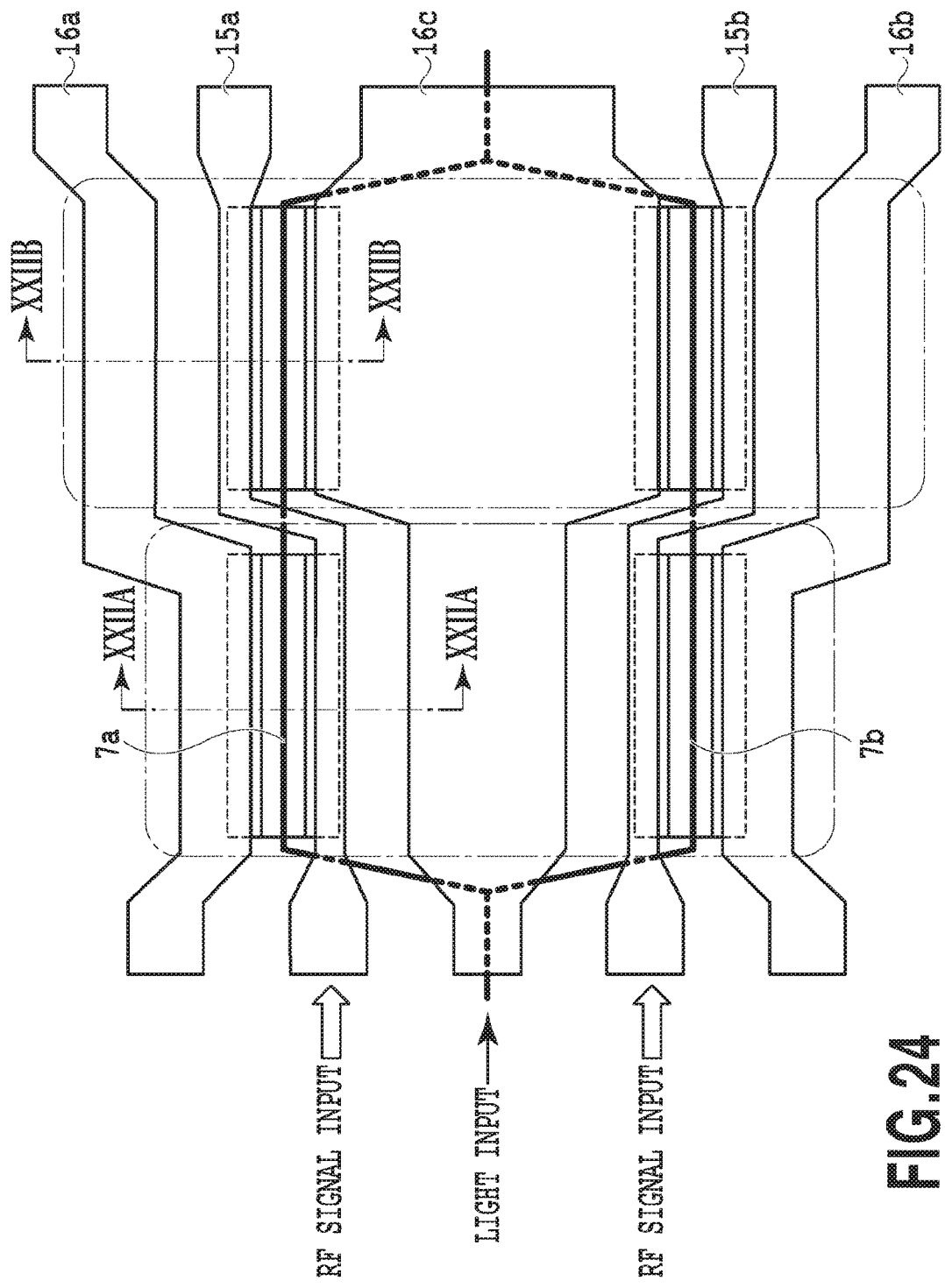
FIG. 24 is a plan view illustrating the configuration of the Mach-Zehnder optical modulator having the dual electrode structure according to the seventh embodiment of the present invention.

FIG. 24 is a plan view illustrating the configuration of the Mach-Zehnder optical modulator having the dual electrode structure according to the seventh embodiment of the present invention.

As shown in FIG. 24, the optical modulator according to Example 7 of the present invention has a modulation unit having a dual electrode structure divided to a first region positioned at the input side of a light propagation direction of the optical waveguide (a part of the cross section XXIIA-XXIIA surrounded by the long dashed short dashed line as shown in the partial cross-sectional view as shown in FIG. 22A) and a second region positioned at the output side (a part of the cross section XXIIB-XXIIB surrounded by the long dashed short dashed line as shown in the partial cross-sectional view as shown in FIG. 22B).

The Mach-Zehnder optical modulator according to the seventh embodiment of the present invention is configured, as shown in FIG. 24, so that the optical waveguides 7a and 7b and the respective two corresponding semiconductor areas are arranged in a straight manner without shifting from the first region to the second region. On the other hand, the two RF electrodes 15a and 15b and the outer ground electrodes 16a and 16b are connected while shifting from the first region to the second region and are positioned with an increased interval therebetween.

In proportion to this, the center ground electrode 16c is formed at the second region at the right side to be wider than the first region at the left side. This consequently allows the optical waveguide 7a and the corresponding semiconductor area to be provided, in the first region at the left side between the RF electrode 15a and the outer ground electrode 16a, and in the second region at the right side between the RF electrode 15a and the center ground electrode 16c, while arranged from the first region to the second region in a straight manner.

In Example 7, the optical waveguide 7a has a straight structure. However, the RF electrode and the outer ground electrode are formed to have a so-called crank shape. By the layout as describe above, the connection area between the first region and the second region have intersections between the RF electrodes and the optical waveguides. However, the RF electrodes and the optical waveguides are formed in different layers and thus cause no difficulty in the manufacturing process.

In FIG. 24 of Example 7, in the first region and the second region, the positional relationship between the optical waveguide and one RF electrode and the doping status of the semiconductor area (the polarity or conductivity of the semiconductor such as p-type/n-type) are both in symmetry of rotation of 180 degrees around the intersection points of the RF electrodes and the optical waveguides. At the same time, the first region and the second region including the two RF electrodes and the optical waveguides are entirely structured so as to form the symmetry of reflection at the upper and lower sides with regard to the center ground electrode 16c.

Each of the two RF electrodes 15a and 15b comprised in the Mach-Zehnder optical modulator is continuous in the middle area between the first region and the second region at the left and right sides, continuously shifting from one side of the straight optical waveguide to the other side. At the one side of the arms, the RF electrode and the optical waveguide are multi-level crossing to each other, but both of the optical waveguides or both of the RF electrodes are not multi-level crossing to each other.

The electric connection between the RF electrode and the semiconductor layer is provided by the via 4 (penetration electrode). In the connection area between the first region and the second region in FIG. 24 however, the via 4 (penetration electrode) providing the connection from the RF electrode 15a to the semiconductor layer 214 does not exist. The RF electrode 15a(15b) is allowed to extend over the optical waveguide 7a(7b) in the connection area. In FIG. 24, in the connection area, the RF electrode 15a(15b) extend from the lower-left side to the upper-right side (or from the upper-left side to the lower-right side). Subsequently in the second region, the RF electrode 15a and the semiconductor layer 214 are electrically connected by way of the via 4, again. Such a structure prevents the via made of metal positioned close to the optical waveguide from absorbing light, thus prevents from causing a loss of light.

The first and second regions are set to have lengths in the light propagation direction that are about ½ of the entire lengths thereof.

Effect of Example 7 in Preventing the Characteristic Deterioration Caused by the Offset of the Implantation Mask In Example 7, it is clear that an effect similar to Example 5 to prevent the characteristic deterioration caused by the mask offset during the implantation process is obtained. Thus, the details will not be described further.

As shown in Example 7, not only the form of Example 5 in which the light waveguide is bent but also a structure in which the RF transmission line is bent also can cancel the offset of the pn junction position due to the mask offset during the implantation. Thus, the two waveguides constituting the Mach-Zehnder modulator have a reduced modulation efficiency difference, thus realizing an optical modulator having a good signal quality.

Description of the Effect of Example 5

Figure 25:
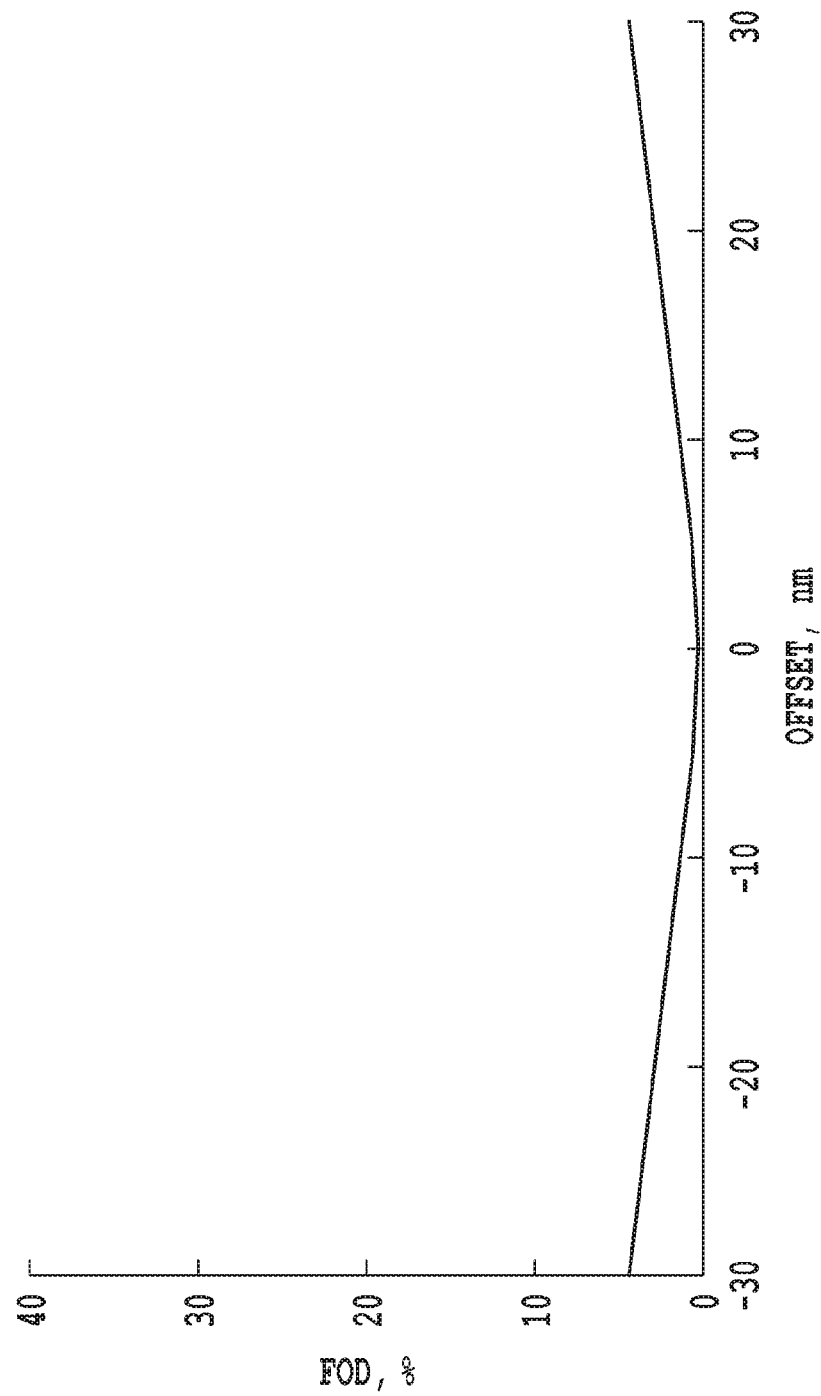
FIG. 25 illustrates how the deterioration (FoD) of the light signal quality of the optical modulator is improved according to the fifth embodiment of the present invention.

FIG. 25 illustrates, in the optical modulator having the dual electrode structure in Example 5 (FIG. 21) of the present invention, how the deterioration of the light signal quality caused by the pn junction position offset is improved by FoD using 64QAM modulation signals defined in FIG. 8B.

In Example 5, an optical modulator having a good signal quality can be realized because the change of the modulation characteristic due to the pn junction position offset in the dual electrode structure is cancelled by providing the first region and the second region. Thus, even when the mask offset of 30 nm (offset amount) occurs during the implantation as shown in FIG. 25, the FoD is 5 percent or less. Thus, a significant improvement is obtained, as in the single electrode structure of Example 1 shown in FIG. 19, when compared with the conventional technique (FIG. 9(a)) in which 30 percent or more of the symbol interval is consumed by the S-like distortion on the constellation.

Figure 26:
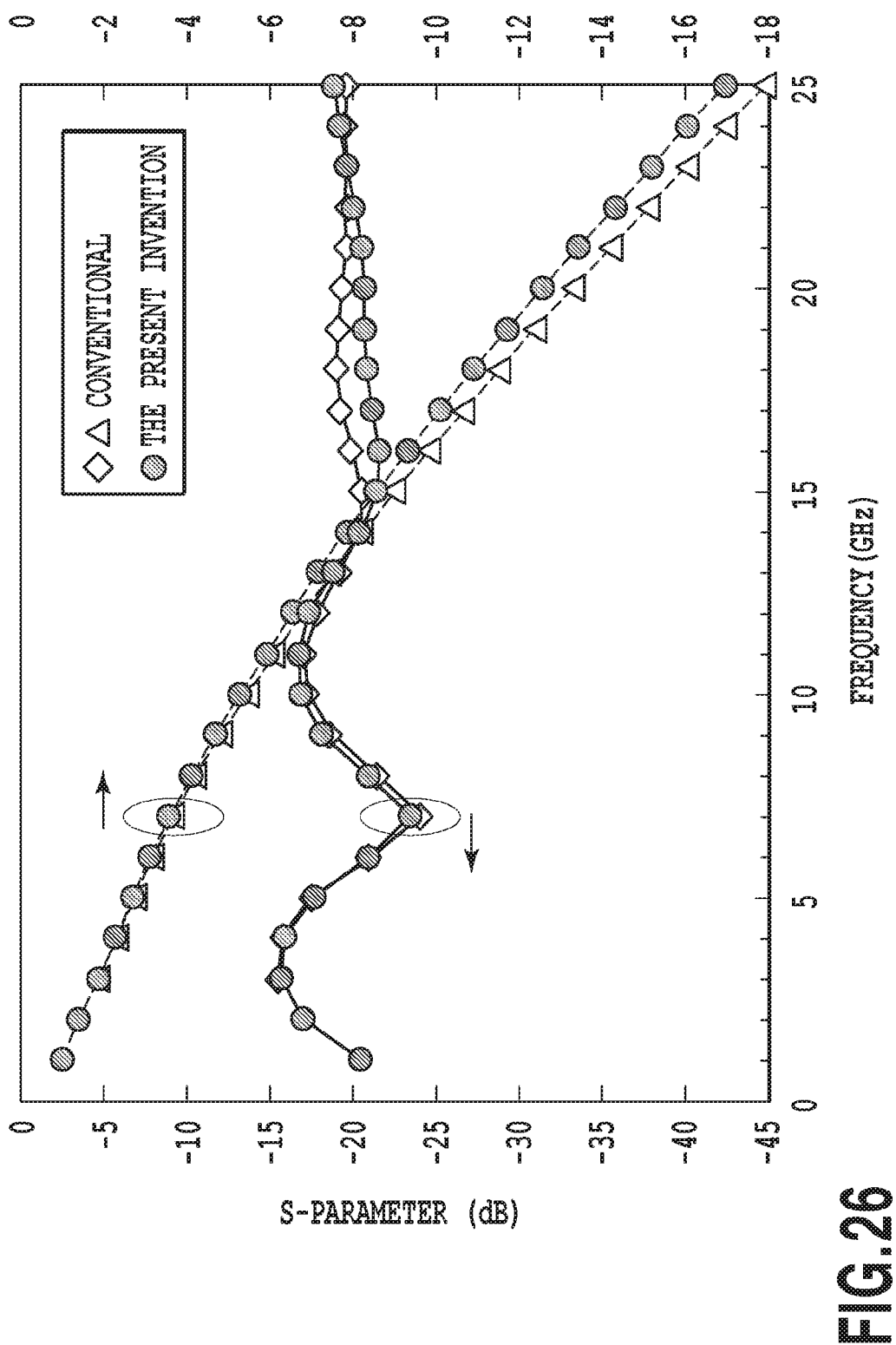
FIG. 26 illustrates the transmission characteristic and the reflection characteristic of the RF signal by S parameters of the optical modulator according to the fifth embodiment of the present invention.

FIG. 26 illustrates the transmission and reflection frequency characteristics in the S parameters of the RF signal with regard to the optical modulator of Example 5 of the present invention. In the case of the optical modulator according to Example 5, the use of the dual electrode structure allows the RF electrode to have a multi-level crossing with the optical waveguide between the first region and the second region. However, by designing the intersection having an appropriate shape for not blocking the propagation of the RF signal, a favorable characteristic can be maintained in which substantially no increase of the reflection or no increase of attenuation of the transmission signal is seen when compared with the conventional technique.

Basic Concept of the Present Invention

As described above, the examples of the present invention have been described for the cases of the single electrodes (Examples 1 to 4) and the dual electrodes (Examples 5 to 7). The basic concept common to these examples is that optical waveguides having two arms constituting a Mach-Zehnder optical modulator are configured so that the semiconductor layer and the waveguides are arranged according to the following criteria. That is, integration amounts of phase changes due to the position offset of the pn junction in the semiconductor area in the optical waveguides from a design value are equal between the two optical waveguides modulated by the two RF electrodes. This consequently prevents the deteriorated signal quality due to the mask offset for example.

Specifically, in the following description, the upper and lower two arms of the basic configuration Mach-Zehnder optical modulator are identified by the subscripts a and b. It is assumed that the position on the light transmission path measured from the input side of the phase modulation unit of the respective arms has a distance x, and that the phase changes fa(x) and fb(x) are caused due to the offset of the pn junction position from the design value in the semiconductor area of the optical waveguide, and that the minute interval dx of the position x. Then, the following formula (1) is established.

$$\int fa(x)dx = \int fb(x)dx \tag{1}$$

This is a basic condition to prevent the deterioration of the signal quality due to the mask offset in the optical modulator output after multiplexing.

In this condition, cancelling the phase change in the respective arms is not always required. So long as the integration amounts of the phase changes in the modulation output lights from both arms are equal, the distortion in the modulation output light after multiplexing is cancelled. Thus, the present invention does not always require that both arms have the doping status of the semiconductor area in the symmetry of reflection or rotation, or that is divided to a plurality of regions.

Having said that, in order to prevent the signal deterioration more accurately, the light modulation unit basically having two arms is desirably configured so that the positional relationship of the optical waveguide to the RF electrode and the doping status of the semiconductor area are uniform and fixed.

Thus, another example of the Mach-Zehnder optical modulator having the dual electrode structure also can be provided as described below.

Example 8

Figure 27:
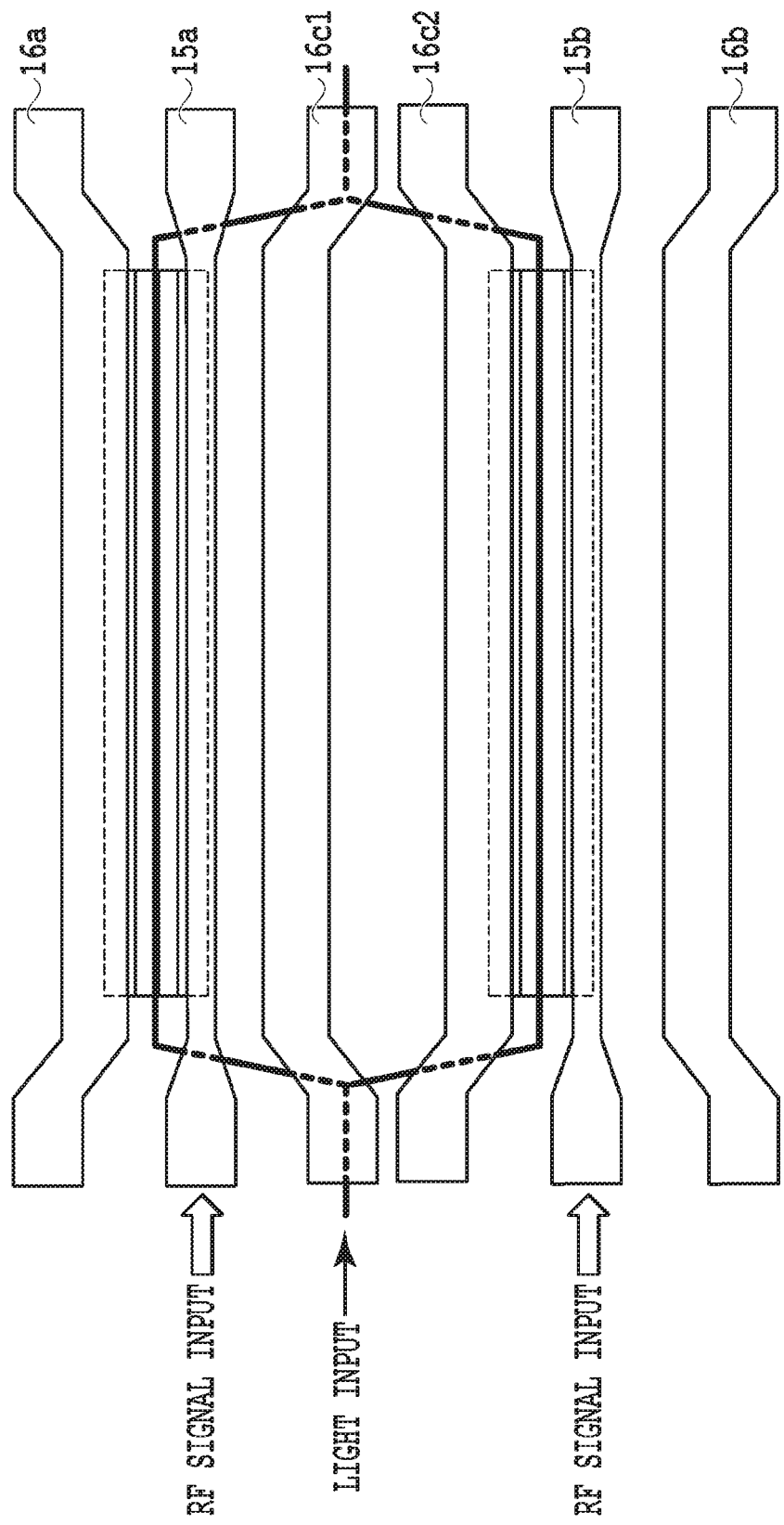
FIG. 27 is a plan view illustrating the configuration of the optical modulator having the dual electrode structure according to the eighth embodiment of the present invention.

FIG. 27 is a plan view illustrating the configuration of the Mach-Zehnder optical modulator having the dual electrode structure according to the eighth embodiment of the present invention.

Example 8 shown in FIG. 27 is characterized in that each of the RF electrodes 15a and 15b have, at the upper and lower sides thereof, the ground electrodes (16a and 16c1 for 15a, 16b and 16c2 for 15b). Optical waveguides are provided between the respective RF electrodes and the upper ground electrodes (16a or 16c2). The semiconductor areas are arranged to have doping statuses provided in the same order in the two optical waveguides at the upper and lower sides, respectively.

However, the p/n also may be reversed in the two optical waveguides so long as the same order is maintained.

Similarly, the optical waveguide also may be provided between the RF electrode and the lower ground electrode (16c1 or 16b).

FIG. 27 shows two center ground electrodes (16c1 and 16c2) interposed between the two RF electrodes 15a and 15b. The lower side ground electrodes 16c2 is abutted to the first conductive (e.g., p-type) semiconductor layer and the upper side ground electrodes 16c1 is close to the second conductive (e.g., n-type) semiconductor layer. If the center ground electrode is a single ground electrode, it is electrically influenced by the upper and lower RF electrodes. Thus, the two center ground electrodes are required.

By the layout as described above, even when the mask offset is caused during the implantation, the two waveguides have modulation efficiencies deteriorated to a similar level, thus preventing chirp occurrence.

These mean that the following formula (2) is established.

$$\int fa(x)dx = \int fb(x)dx = \text{constant} \tag{2}$$

Furthermore, the modulation unit of the optical modulator can be configured, as has been described above for Examples 1 to 7, to have a first region positioned at the input side of a light propagation direction and a second region positioned at the output side. An intersection of the RF electrodes and/or the optical waveguides can be provided in the connection area between the first region and the second region, thus cancelling the phase change due to the mask offset for each arm.

This means that the following formula (3) is established.

$$\int fa(x)dx = \int fb(x)dx = 0 \tag{3}$$

As described above, the optical modulator according to the present invention can be applied to both of the single electrode structure and the dual electrode structure to cancel the phase change due to the pn junction position offset (offset amount) caused by the mask offset during the implantation. Two waveguides constituting the Mach-Zehnder modulator in the present invention can have a reduced difference in the modulation efficiency, thus realizing an optical modulator having a good signal quality.

Furthermore, the attenuation due to the propagation loss of the radio frequency electric signal on the RF electrode causes the input side and the output side of the RF electrode to have different modulation efficiencies and resulting in a different cancelling efficiencies. This difference in the efficiency can be cancelled by allowing the first region and the second region to have appropriately-set lengths. Such an optical modulator has a modulation efficiency having a good symmetry.

Thus, such an optical modulator can be provided that suppresses the chirp during the light modulation and that has a good waveform quality.

REFERENCE SIGNS LIST 1 and 3 $SiO_2$ clad layer
2 Si layer
201 Optical waveguide core part
202 Slab region
211 High concentration p-type semiconductor layer
212 Intermediate concentration p-type semiconductor layer
213 Intermediate concentration n-type semiconductor layer
214 High concentration n-type semiconductor layer
4 Via (penetration electrode)
5a, 5b, 15a, and 15b RF electrode
6, 6a, and 6b DC electrode
7, 7a, and 7b Optical waveguide
16a, 16b, 16c, 16c1, and 16c2 Ground electrode

The invention claimed is:

1. An optical modulator, comprising:
two RF electrodes for applying one pair of differential signal voltages;
at least one fixed potential electrode for applying a fixed potential;
a first conductive semiconductor layer and a second conductive semiconductor layer abutted to the two RF electrodes or the fixed potential electrode; and
a light modulation unit including two optical waveguides branched from one optical waveguide that are arranged along a pn junction unit functioning as a boundary between the first and second conductive semiconductor layers, wherein:
the modulation unit of the optical modulator has a first region positioned at the input side of a light propagation direction and a second region positioned at the output side, the connection of the first region and the second region has a structure having a multi-level crossing such that one of the two RF electrodes has a multi-level crossing with one of the two optical waveguides on each side, and the two optical waveguides both have the positional relation of the semiconductor doping status in the first region and the second region that is provided in a reversed position viewed in the light propagation direction in the respective optical waveguide, and the two optical waveguides have a structure of not multi-level crossing with respect to each other, and the two RF electrodes have a structure of not multi-level crossing with respect to each other.

2. The optical modulator according to claim 1, wherein: the modulation unit of the optical modulator has one or two of multi-level crossing structure(s) in each of the two optical waveguides.

3. The optical modulator according to claim 1, wherein: the modulation unit of the optical modulator has, in the part of multi-level crossing structure, no via connecting the at least one of the two RF electrodes and the semiconductor layer.

4. The optical modulator according to claim 3, wherein: the first region has the entire length in the light propagation direction that is shorter than the entire length of the second region in the light propagation direction.

5. The optical modulator according to claim 3, wherein: at least one of the first region and the second region is divided to two or more regions provided alternately in the light propagation direction.

6. The optical modulator according to claim 5, wherein: the first region is divided to two regions so as to interpose the second region so that a length ratio of 1:2:1 is provided thereamong in the light propagation direction.

7. The optical modulator according to claim 1, wherein: the optical modulator is of a dual electrode structure, and the fixed potential electrode comprises at least one ground electrode provided between the two RF electrodes and two ground electrodes provided, respectively, at outer sides of the two RF electrodes.

8. An optical modulator, comprising:

two RF electrodes comprising a first RF electrode and a second RF electrode for applying one pair of differential signal voltages;

at least one fixed potential electrode for applying a fixed potential;

a first conductive semiconductor layer and a second conductive semiconductor layer abutted to the first RF electrode, the second RF electrode or the fixed potential electrode; and a light modulation unit including two optical waveguides comprising a first optical waveguide and a second optical waveguide that are branched from one input optical waveguide, and that are arranged along a pn junction unit functioning as a boundary between the first and second conductive semiconductor layers, wherein:

the light modulation unit of the optical modulator has a first region positioned at the input side of a light propagation direction and a second region positioned at the output side, and the two optical waveguides both have the positional relation of the semiconductor doping status in the first region and the second region that is provided in a reversed position viewed in the light propagation direction in the respective optical waveguide, and the first RF electrode only modulates the first optical waveguide that does not multi-level cross with other optical waveguide, and the first RF electrode is configured to multi-level cross with the first optical waveguide in the connection of the first region and the second region, the second RF electrode only modulates the second optical waveguide that does not multi-level cross with other optical waveguide, and the second RF electrode is configured to multi-level cross with the second optical waveguide in the connection of the first region and the second region.

* * * * *